(12) United States Patent
Tsuda

(10) Patent No.: US 7,808,533 B2
(45) Date of Patent: Oct. 5, 2010

(54) ELECTRONIC CAMERA HAVING SIGNAL PROCESSING UNITS THAT PERFORM SIGNAL PROCESSING ON IMAGE DATA

(75) Inventor: Yutaka Tsuda, Kawasaki (JP)

(73) Assignee: Nikon Corporation, Tokyo (JP)

(*) Notice: Subject to any disclaimer, the term of this patent is extended or adjusted under 35 U.S.C. 154(b) by 346 days.

(21) Appl. No.: 11/819,994

(22) Filed: Jun. 29, 2007

(65) Prior Publication Data

US 2007/0252903 A1 Nov. 1, 2007

Related U.S. Application Data

(60) Division of application No. 09/497,482, filed on Feb. 4, 2000, now Pat. No. 7,253,836, which is a continuation-in-part of application No. 09/342,512, filed on Jun. 29, 1999, now abandoned.

(30) Foreign Application Priority Data

| Jun. 30, 1998 | (JP) | ............................ 10-183918 |
| Jun. 30, 1998 | (JP) | ............................ 10-183919 |
| Jun. 30, 1998 | (JP) | ............................ 10-183920 |
| Jun. 30, 1998 | (JP) | ............................ 10-183921 |
| Aug. 24, 1998 | (JP) | ............................ 10-237321 |
| Jul. 28, 1999 | (JP) | ............................ 11-213299 |

(51) Int. Cl.
H04N 5/76 (2006.01)
(52) U.S. Cl. .................. 348/231.6; 348/231.2
(58) Field of Classification Search ............. 348/220.1, 348/231.99, 231.2, 231.6, 231.8, 254, 333.11
See application file for complete search history.

(56) References Cited

U.S. PATENT DOCUMENTS 4,774,565 A 9/1988 Freeman (Continued)

FOREIGN PATENT DOCUMENTS

JP A-S62-185489 8/1987

(Continued)

OTHER PUBLICATIONS

Aug. 6, 2009 Non-final Rejection for copending U.S. Appl. No. 11/819,666.

(Continued)

Primary Examiner—Timothy J Henn
(74) Attorney, Agent, or Firm—Oliff & Berridge, PLC

(57) ABSTRACT

A CCD captures a subject image having passed through a taking lens and an image processing circuit performs various types of image pre-treatment including gamma correction and white balance on image data corresponding to n lines×m rows output by the CCD. The image processing circuit also performs format processing on the data. The data are then compressed at a compression circuit. The white balance adjustment and the like are implemented in line sequence at a line processing circuit which engages in signal processing in pixel sequence in units of individual lines in the output from the CCD. The image data having undergone the pre-treatment are then subjected to format processing prior to JPEG compression, at a block processing circuit that engages in signal processing in units of individual blocks each ranging over an n×m (N>n, M>m) block. In other words, the signal processing is performed in block sequence.

4 Claims, 21 Drawing Sheets

U.S. PATENT DOCUMENTS

| | | | |
|---|---|---|---|
| 5,016,107 A | | 5/1991 | Sasson et al. |
| 5,153,730 A | | 10/1992 | Nagasaki et al. |
| 5,206,730 A | | 4/1993 | Sakai |
| 5,305,096 A | | 4/1994 | Yamagami et al. |
| 5,319,451 A | | 6/1994 | Sasaki et al. |
| 5,343,243 A | | 8/1994 | Maeda |
| 5,373,322 A | | 12/1994 | Laroche et al. |
| 5,402,171 A | | 3/1995 | Tagami et al. |
| 5,414,464 A | | 5/1995 | Sasaki |
| 5,525,957 A | * | 6/1996 | Tanaka .................... 348/220.1 |
| 5,579,047 A | | 11/1996 | Yamagami et al. |
| 5,581,357 A | | 12/1996 | Sasaki et al. |
| 5,631,701 A | | 5/1997 | Miyake |
| 5,640,619 A | | 6/1997 | Takayama et al. |
| 5,778,106 A | | 7/1998 | Juenger et al. |
| 5,867,214 A | * | 2/1999 | Anderson et al. ........ 348/231.6 |
| 5,917,556 A | | 6/1999 | Katayama |
| 5,920,343 A | | 7/1999 | Watanabe et al. |
| 6,005,613 A | * | 12/1999 | Endsley et al. ........... 348/231.6 |
| 6,075,563 A | | 6/2000 | Hung |
| 6,130,710 A | * | 10/2000 | Yasuda .................... 348/220.1 |
| 6,288,743 B1 | * | 9/2001 | Lathrop .................... 348/231.9 |
| 6,292,218 B1 | * | 9/2001 | Parulski et al. ........... 348/220.1 |
| 6,359,643 B1 | * | 3/2002 | Visvanathan et al. ..... 348/14.14 |
| 6,421,083 B1 | | 7/2002 | Takakura |
| 6,529,238 B1 | | 3/2003 | Mahant-Shetti et al. |
| 6,532,039 B2 | | 3/2003 | Anderson |
| 6,661,451 B1 | | 12/2003 | Kijima et al. |
| 6,954,228 B1 | | 10/2005 | Acharya et al. |
| 2002/0176009 A1 | | 11/2002 | Johnson et al. |

FOREIGN PATENT DOCUMENTS

| | | |
|---|---|---|
| JP | A-S63-20993 | 1/1988 |
| JP | A-2-25105 | 1/1990 |
| JP | A-H02-213292 | 8/1990 |
| JP | A-02-278983 | 11/1990 |
| JP | A-H03-148990 | 6/1991 |
| JP | A-3-154487 | 7/1991 |
| JP | A-H04-23576 | 1/1992 |
| JP | A-4-88782 | 3/1992 |
| JP | A-4-501645 | 3/1992 |
| JP | A-H04-107083 | 4/1992 |
| JP | A-5-176333 | 7/1993 |
| JP | A-05-252522 | 9/1993 |
| JP | A-H07-107505 | 4/1995 |
| JP | A-7-222178 | 8/1995 |
| JP | A-7-288761 | 10/1995 |
| JP | A-08-214145 | 8/1996 |
| JP | A-9-18773 | 1/1997 |
| JP | A-9-261670 | 10/1997 |
| JP | A-9-270991 | 10/1997 |
| JP | A-H09-322191 | 12/1997 |
| JP | A-10-4858 | 1/1998 |
| JP | A-10-108116 | 4/1998 |
| JP | A-2000-23184 | 1/2000 |
| JP | 2000-293145 | 10/2000 |
| WO | WO 90/05425 | 5/1990 |

OTHER PUBLICATIONS

Office Action in U.S. Appl. No. 11/819,666; mailed May 27, 2010.

* cited by examiner

FIG. 5

|   | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|----|----|----|----|----|----|----|----|----|
| 1 | R | G | R | G | R | G | R | G | R | G  | R  | G  | R  | G  | R  | G  | R  | G  | · · |
| 2 | G | B | G | B | G | B | G | B | G | B  | G  | B  | G  | B  | G  | B  | G  | B  | · · |
| 3 | R | G | R | G | R | G | R | G | R | G  | R  | G  | R  | G  | R  | G  | R  | G  | · · |
| 4 | G | B | G | B | G | B | G | B | G | B  | G  | B  | G  | B  | G  | B  | G  | B  | · · |
| 5 | R | G | R | G | R | G | R | G | R | G  | R  | G  | R  | G  | R  | G  | R  | G  | · · |
| 6 | G | B | G | B | G | B | G | B | G | B  | G  | B  | G  | B  | G  | B  | G  | B  | · · |
| 7 | R | G | R | G | R | G | R | G | R | G  | R  | G  | R  | G  | R  | G  | R  | G  | · · |
| 8 | G | B | G | B | G | B | G | B | G | B  | G  | B  | G  | B  | G  | B  | G  | B  | · · |
| 9 | R | G | R | G | R | G | R | G | R | G  | R  | G  | R  | G  | R  | G  | R  | G  | · · |
| 10| G | B | G | B | G | B | G | B | G | B  | G  | B  | G  | B  | G  | B  | G  | B  | · · |

ADD PIXEL DATA IN SHADED AREAS

|   | 1 | 2 | 3 | ... | 16 |
|---|---|---|---|-----|----|
| 1 | B | G | B | · |  |
| 2 | G | R | G | · |  |
| 3 | B | G | B | · |  |
| ⋮ | · | · | · |  |  |
| 16 |  |  |  |  |  |

D16-2:

|   | 1 | 2 | 3 | ... | 16 |
|---|---|---|---|-----|----|
| 1 | G | G | G | · |  |
| 2 | G | G | G | · |  |
| 3 | G | G | G | · |  |
| ⋮ | · | · | · |  |  |
| 16 |  |  |  |  |  |

D16-3:

|   | 1 | 2 | 3 | ... | 16 |
|---|---|---|---|-----|----|
| 1 | B-G | 0 | B-G | · |  |
| 2 | 0 | R-G | 0 | · |  |
| 3 | B-G | 0 | B-G | · |  |
| ⋮ | · | · | · |  |  |
| 16 |  |  |  |  |  |

R, B SEPARATION →

D16-4:

|   | 1 | 2 | 3 | ... | 16 |
|---|---|---|---|-----|----|
| 1 | B-G | 0 | B-G | · |  |
| 2 | 0 | 0 | 0 | · |  |
| 3 | B-G | 0 | B-G | · |  |
| ⋮ | · | · | · |  |  |
| 16 |  |  |  |  |  |

D16-5:

|   | 1 | 2 | 3 | ... | 16 |
|---|---|---|---|-----|----|
| 1 | 0 | 0 | 0 | · |  |
| 2 | 0 | R-G | 0 | · |  |
| 3 | 0 | 0 | 0 | · |  |
| ⋮ | · | · | · |  |  |
| 16 |  |  |  |  |  |

FIG. 13

| R-G (i-2, j-2) | 0 | R-G (i, j-2) | 0 | R-G (i+2, j-2) |
|---|---|---|---|---|
| 0 | 0 | 0 | 0 | 0 |
| R-G (i-2, j) | 0 | R-G (i, j) | 0 | R-G (i+2, j) |
| 0 | 0 | 0 | 0 | 0 |
| R-G (i-2, j+2) | 0 | R-G (I, j+2) | 0 | R-G (i+2, j+2) |

ELECTRONIC CAMERA HAVING SIGNAL PROCESSING UNITS THAT PERFORM SIGNAL PROCESSING ON IMAGE DATA

This is a Division of U.S. patent application Ser. No. 09/497,482 filed Feb. 4, 2000 (now U.S. Pat. No. 7,253,836), which in turn is a Continuation-In-Part of U.S. patent application Ser. No. 09/342,512 filed Jun. 29, 1999 (now abandoned). The disclosure of each of the prior applications is hereby incorporated by reference herein in its entirety.

INCORPORATION BY REFERENCE

The disclosures of the following priority applications are herein incorporated by reference:
Japanese Patent Application No. 10-183918, filed Jun. 30, 1998
Japanese Patent Application No. 10-183919, filed Jun. 30, 1998
Japanese Patent Application No. 10-183920, filed Jun. 30, 1998
Japanese Patent Application No. 10-183921, filed Jun. 30, 1998
Japanese Patent Application No. 10-237321, filed Aug. 24, 1998
Japanese Patent Application No. 11-213299, filed Jul. 28, 1999

BACKGROUND OF THE INVENTION

1. Field of the Invention

The present invention relates to a digital camera that stores in memory a subject as image data that are electronically compressed, and it also relates to a storage medium that stores an image signal processing program. Furthermore, the present invention relates to a carrier wave that is encoded to transmit a control program for white balance adjustment on image data. It also relates to an electronic camera that allows selection to be made between recording of irreversible image data and recording of raw data.

2. Description of the Related Art

Electronic still cameras in the known art include the type provided with a viewfinder device to which a subject image having passed through a taking lens is guided by a quick return mirror, an image-capturing device such as a CCD that is provided at a rearward of the quick return mirror to capture an image of the subject image and output image data, an image processing circuit that performs image processing such as white balance and gamma correction on the image data output by the image-capturing device, a compression circuit that compresses the data which have undergone image processing through a method such as JPEG and stores the data in a storage medium such as a flash memory and a monitor that displays the data having undergone the image processing. In the image processing circuit, parameters such as the R gain and the B gain for white balance adjustment or the gradation curve for gamma correction are calculated based upon a preset algorithm. In addition, the image data are converted to 16×8 sets of brightness data Y and 8×8 sets of Cr and Cb color difference data for JPEG compression.

The image-capturing device in such an electronic still camera in the prior art structured as described above presents the following problems.

(1) Both the image pre-treatment such as white balance or gamma correction and the image post-treatment, in which the data that have undergone the image pre-treatment are formatted for the JPEG compression, are performed in units of individual lines in correspondence to the read performed at the CCD. Because of this, in a high image quality electronic still camera with the number of pixels at the CCD exceeding two million, the capacity of the line buffer memory employed for pipeline operation and the like, is bound to be very large, resulting in the camera becoming expensive. This problem may be explained as follows.

When performing signal processing on the output from a solid image-capturing element, N×M sets of image data corresponding to one screen output by the image-capturing element are output in point sequence in units of individual lines. Thus, when performing signal processing including pixel interpolation processing and filtering processing, a line buffer memory supporting four lines, for instance, is required if the filtering processing is to be performed in sets of 5×5. In other words, the processing can be performed only when image data corresponding to four lines have been accumulated in the memory. Such a line buffer memory supporting four lines is required for each of the various types of processing such as filtering processing and interpolation processing.

If a line buffer memory that supports four lines is provided at a 1-chip processing IC for each of the various types of processing required, such as the filtering processing and the interpolation processing described above, the ratio of the area occupied by the memory increases, which leads to an increase in the number of gates at the 1-chip processing IC, resulting in higher cost. In particular, in a high resolution type image-capturing element having more than two million pixels with a large number of pixels per line, the cost will be especially high. In addition, if the line buffer memory is provided outside the 1-chip processing IC, twenty 10-bit input/output pins, for instance, will be required. This means that 20 input/output pins will be necessary for each line buffer memory to result in an increase in the package size of the 1-chip processing IC.

(2) In the image-capturing device in an electronic still camera in the prior art, the interpolation processing for an (R-G) signal and a (B-G) signal, matrix processing through which a Y signal, a Cr signal and a Cb signal are generated using the (R-G) signal, the (B-G) signal and the G signal and LPF processing through which low frequency signals are extracted from the Y signal, the Cr signal and the Cb signal is performed in time sequence to format the data for JPEG compression and to suppress false colors and color moire from occurring. As a result, particularly in the case of a high image quality electronic still camera with the number of pixels at the CCD exceeding two million, the length of time of processing is bound to be large, resulting in poor operability.

(3) In the image-capturing device in an electronic still camera in the prior art, a single primary color type CCD, two CCDs (one for G and the other for R/B) or three CCDs (one each for R, G and B) are employed. When using a single CCD, since an RGB color filter is provided at the front surface of each pixel at the CCD, an R signal, a G signal or a B signal is missing from a given pixel. Thus, interpolation is performed for pixels without a G signal component by using the G signals of pixels that have been actually obtained to generate G signals for all the pixels, and interpolation in regard to the (R-G) signal and the (B-G) signals is likewise performed. The same principle applies when using two CCDs, as well.

However, depending upon the nature of the image that has been captured or the characteristics of the low pass filter employed, false colors or moire may occur after the interpolation processing, which results in a great degree of degradation in the image quality. While the Cr signal and the Cb signal among the Y signal, the Cr signal and the Cb signal described above created using the R, G and B signals are processed through the low pass filter to suppress false colors or moire in the prior art, this means does not achieve satisfactory results in a high image quality electronic still camera having more than two million pixels at the CCD.

(4) Since the white balance adjustment is achieved using predetermined white balance adjustment coefficients in the image-capturing device in an electronic still camera in the prior art, there is the likelihood of a color-cast image being generated if the white balance adjustment coefficients are set erroneously. This problem tends to occur more readily in a high image quality electronic still camera with the number of pixels at the CCD exceeding two million.

Electronic cameras in which selection between the two different data formats described below can be performed when recording image data obtained through image-capturing have been known in the prior art.

(1) Irreversible compressed data obtained through JPEG or the like that have undergone a sequence of image processing (2) Raw data output by the image-capturing device The first type of data, i.e., irreversible compressed data are advantageous in that since the code volume is relatively small, a large number of images can be stored in an external recording medium such as a memory card. In addition, they are recorded in a general-purpose format which allows data decoded by using a common image viewing software program or the like to be printed or displayed directly.

The second type of data, i.e., raw data are image data faithful to the output signal from the image-capturing device. A data recording format of raw data facilitates external processing. Since raw data which, undergo very little irreversible gradation conversion or data compression, contain a large volume of information such as the number of quantization bits, they have a wide dynamic range as image information. Thus, they provide an advantage in that they can be processed in an ideal manner without the tendency to lose fine gradation components. For this reason, highly advanced data processing and a higher quality are required in this type of raw data. The data format of raw data is particularly suited for printing and design applications.

Normally, an electronic camera requires a greater length of time for image processing compared to cameras using a silver halide film. In order to achieve a degree of operability in an electronic camera comparable to that of cameras using a silver halide film, it is crucial to minimize the length of time required for image processing. However, in an electronic camera in the prior art, a raw data read/write operation performed via an image memory is always necessary. This tends to lead to a delay occurring in signal processing performed on irreversible compressed data by a length of time corresponding to the length of time spent on the raw data read/write.

In addition, processing circuits that perform relatively complex processing, a prime example of which is pixel value matrix operation, are concentrated in a processing unit at a stage preceding the stage for gamma control operation. Since raw data with a large number of quantization bits are handled in this state at these processing circuits, the circuit structures of the processing circuits tend to be complex and there is also a problem of a greater length of time required for signal processing.

SUMMARY OF THE INVENTION

A first object of the present invention is to provide a digital camera that does not necessitate any increase the capacity of buffer memory and thus, achieves a reduction in cost even when the number of pixels is great.

A second object of the present invention is to provide a storage medium that stores a program for implementing signal processing which achieves a reduction in the required capacity of the buffer memory even when processing image data for which image-capturing has been performed using an image-capturing device having a large number of pixels.

A third object of the present invention is to provide a digital camera that achieves a reduction in the length of time required for data formatting or processing through which false colors or moire is prevented even when the number of pixels is large.

A fourth object of the present invention is to provide a storage medium that stores a program for implementing signal processing in which data formatting and processing for preventing false colors and moire can be 3-4 performed within a short period of time even when handling image data for which image-capturing has been performed using an image-capturing device with a great number of pixels.

A fifth object of the present invention is to provide a digital camera that suppresses the color-cast phenomenon occurring due to an error manifesting following the white balance adjustment performed by an external sensor to a satisfactory degree.

A sixth object of the present invention is to provide a storage medium that stores a program for implementing signal processing through which the color-cast phenomenon occurring due to an error manifesting after the white balance adjustment performed by an external sensor can be suppressed to a satisfactory degree.

The digital camera according to the present invention comprises an image-capturing device that captures a subject image having passed through a taking lens and outputs image data, a recording processing circuit that performs recording processing on the image data and an image processing circuit that performs a pre-treatment (includes gamma correction and white balance correction) on the image data corresponding to N lines×M rows output by the image-capturing device in units of individual lines in line sequence and then performs format processing (includes interpolation processing, LPF processing, BPF processing and color difference signal calculation processing) that corresponds to the type of recording performed at the recording processing circuit on the image data having undergone the pre-treatment in units of individual blocks corresponding to n lines×m rows (N>n, M>m) in block sequence.

The image processing performed in this digital camera may be implemented on a computer. The program stored in a storage medium for this purpose implements signal processing including format processing through which the image data of an image captured at an image-capturing device are formatted for recording, various types of pre-treatment that are implemented prior to the format processing and recording processing through which the image data having undergone format processing are recorded, with signal processing during the pre-treatment performed in units of individual lines in line sequence on image data corresponding to N lines×M rows and signal processing during the format processing performed in units of individual blocks corresponding to n lines×m rows (N>n, M>m) in block sequence on the image data having undergone the pre-treatment.

Alternatively, the digital camera according to the present invention may comprise an image-capturing device that captures a subject image having passed through a taking lens and outputs image data, a recording processing circuit that performs recording processing on the image data and an image processing circuit that, with the image data output by the image-capturing device input as data corresponding to n lines×m rows, calculates a color difference signal based upon the image data thus input, performs interpolation processing and low pass filtering processing at once on the color difference signal using filter coefficients for interpolation/low pass filtering and then generates a formatted signal by performing matrix processing corresponding to the type of recording implemented at the recording processing circuit.

The image processing performed in this digital camera may be implemented on a computer. The program stored in a storage medium for this purpose executes format processing that formats the image data of an image captured at an image-capturing device for recording, in which color difference signals corresponding to n lines×m rows are calculated based upon the image data that are input, interpolation processing and low pass filtering processing are executed at once on the color difference signals corresponding to n lines×m rows using filter coefficients for interpolation/low pass filtering and then a formatted signal is generated through matrix processing and recording processing through which the image data having undergone the format processing are recorded.

Furthermore, in the digital camera according to the present invention, which may comprise an image-capturing device that captures a subject image having passed through a taking lens and outputs image data, an image processing circuit that performs image processing including data format processing appropriate for data compression on the image data output by the image-capturing device and a compression circuit that compresses image data output by the image processing circuit, the image processing circuit engages in median processing on image data corresponding to n×m pixel areas to execute the format processing.

The image processing performed in this digital camera may be implemented on a computer. The program stored in a storage medium for this purpose implements signal processing including format processing through which the image data of an image captured at the image-capturing device are formatted for compression, various types of signal processing that are implemented prior to the format processing and compression processing through which image data having undergone the format processing are compressed, with median processing performed on image data corresponding to n×m pixel areas during the format processing.

By extracting (n-i)×(m-j) sets of image data among the image data corresponding to the n×m pixel areas and performing median processing on them, the length of time required for the median processing can be reduced.

Moreover, the digital camera according to the present invention may comprise an image-capturing device that captures a subject image having passed through a taking lens and outputs image data and an image processing circuit that executes image processing on the image data output by the image-capturing device, in which median processing is implemented on (n-i)×(m-j) sets of image data extracted from image data corresponding to an n×m pixel area.

The image processing performed in this digital camera may be implemented on a computer. The program stored in a storage medium for this purpose implements a specific type of image processing on the image data of an image captured at the image-capturing device, in which median processing is executed on (n-i)×(m-j) sets of image data extracted from image data corresponding to an n×m pixel area.

The digital camera according to the present invention may comprise an image-capturing device that captures a subject image that passes through a taking lens and outputs image data, a white balance adjustment circuit that performs white balance adjustment on the image data output by the image-capturing device, a white balance fine adjustment coefficient calculation circuit that calculates a white balance fine adjustment coefficients based upon image data having undergone the white balance adjustment, output by the white balance adjustment circuit and a white balance fine adjustment circuit that performs white balance fine adjustment using the white balance fine adjustment coefficients on image data having undergone the white balance adjustment output by the white balance adjustment circuit.

The image processing implemented in this digital camera may be executed by a computer. The program stored in a storage medium for this purpose implements white balance adjustment processing in which white balance adjustment is performed on the image data of an image-captured at an image-capturing device, white balance fine adjustment coefficient calculation processing in which white balance fine adjustment coefficients are calculated using image data having undergone the white balance adjustment through the white balance adjustment processing and white balance fine adjustment processing in which white balance fine adjustment is performed using the white balance fine adjustment coefficients on the image data having undergone the white balance adjustment.

The white balance fine adjustment coefficients are calculated based upon the average values calculated for the R, B and G signals in the image data having undergone the white balance adjustment. Alternatively, it may be calculated based upon the histograms of the brightness levels calculated for the R, B and G signals of the image data having undergone the white balance adjustment.

In addition, the digital camera according to the present invention may comprise an image-capturing device that captures a subject image that passes through a taking lens and outputs image data, a white balance adjustment circuit that performs white balance adjustment on the image data output by the image-capturing device, an image area selection apparatus that selects one image area among a preset plurality of image areas, a white balance fine adjustment coefficient calculation circuit that calculates white balance fine adjustment coefficients using image data within an area set in relation with the one image area selected by the image area selection apparatus, among the image data having undergone the white balance adjustment output by the white balance adjustment circuit, and a white balance fine adjustment circuit that performs white balance fine adjustment using the white balance fine adjustment coefficients calculated at the white balance fine adjustment coefficient calculation circuit.

If the digital camera is provided with a focal point detection device that detects the state of focal adjustment relative to the subject for each of a preset plurality of focal point detection areas and a focal point detection area selection apparatus that selects one of the plurality of focal point detection areas based upon focal adjustment statuses, the white balance fine adjustment coefficients are calculated by selecting image data in an image area related to the focal point detection area selected by the focal point detection area selection apparatus.

The image processing performed in the digital camera may be executed on a computer. The program stored in a storage medium for this purpose implements white balance adjustment processing in which white balance adjustment is performed on an image captured at the image-capturing device, image area selection processing in which one of a preset plurality of image areas is selected, white balance fine adjustment coefficient calculation processing in which white balance fine adjustment coefficients are calculated using image data within an area set in relation to the one image area selected through the image area selection processing from image data having undergone white balance adjustment through the white balance adjustment processing and white balance fine adjustment processing in which white balance fine adjustment is performed on the image data having undergone the white balance adjustment using the white balance fine adjustment coefficients.

Another object of the present invention is to provide a carrier wave encoded to transmit a control program for white balance adjustment on image data.

In a carrier wave encoded to transmit a control program for white balance adjustment on image data, the control program includes instructions for; white balance adjustment processing in which white balance adjustment is performed on image data of an image captured at an image-capturing device; image area selection processing in which an image area is selected from a preset plurality of image areas; white balance fine adjustment coefficient calculation processing in which white balance fine adjustment coefficients are calculated using image data within an area set in relation to the image area selected through the image area selection processing; and white balance fine adjustment processing in which white balance fine adjustment is performed on image data having undergone white balance adjustment using white balance fine adjustment coefficients.

Another object of the present invention is to provide an electronic camera that is capable of reducing the length of signal processing time while allowing selection to be made between recording irreversible image data and recording raw data.

The electronic camera according to the present invention comprises an image-capturing device, a first signal processing unit that performs, at least, A/D conversion on an image signal generated by the image-capturing device to convert the signal to digital image data, a second signal processing unit that performs irreversible signal processing on the image data resulting from a conversion performed at the first signal processing unit, an image memory capable of temporarily storing the image data and an operation control unit that dynamically selects signal paths between the two signal processing units in correspondence to the operating mode set to (1) or (2) below.

(1) A fast mode, in which a sequence of signal processing is continuously executed by providing an output from the first signal processing unit to the second signal processing unit and causing the two signal processing units to engage in synchronous operation.

(2) An original image mode, in which an output from the first signal processing unit is stored in the image memory, image data read out from the image memory are provided to the second signal processing unit and the two signal processing unit are each made to operate with their own timing.

The "storage area in the image memory provided to store the output from the first signal processing unit in the original image mode" can be utilized by the operation control unit as a buffer area where image data undergoing processing are kept in retreat in the fast mode.

In addition, the operation control unit accepts an external operation indicating whether or not raw data, i.e., image data before undergoing irreversible signal processing at the second signal processing unit, are required, selects and executes the fast mode if the external operation indicates that no raw data are required, and selects and executes the original image mode if the external operation indicates that raw data are required to output the raw data present in the image memory to the outside or to store the raw data present in the image memory at a recording medium.

It is desirable that in the original image mode, the operation clock at the second signal processing unit be set faster than the operation clock at the first signal processing unit by the operation control unit.

The second signal processing unit may be a unit that engages in, at least, either "irreversible gradation conversion" or "irreversible pixel thinning."

BRIEF DESCRIPTION OF THE DRAWINGS

FIG. 5 illustrates the color filter array;

FIG. 12 illustrates the details of the processing performed at the color difference signal generation circuit;

FIG. 13 illustrates an example of data processed at the interpolation/LPF circuit;

DETAILED DESCRIPTION OF THE PREFERRED EMBODIMENTS

Figure 1:
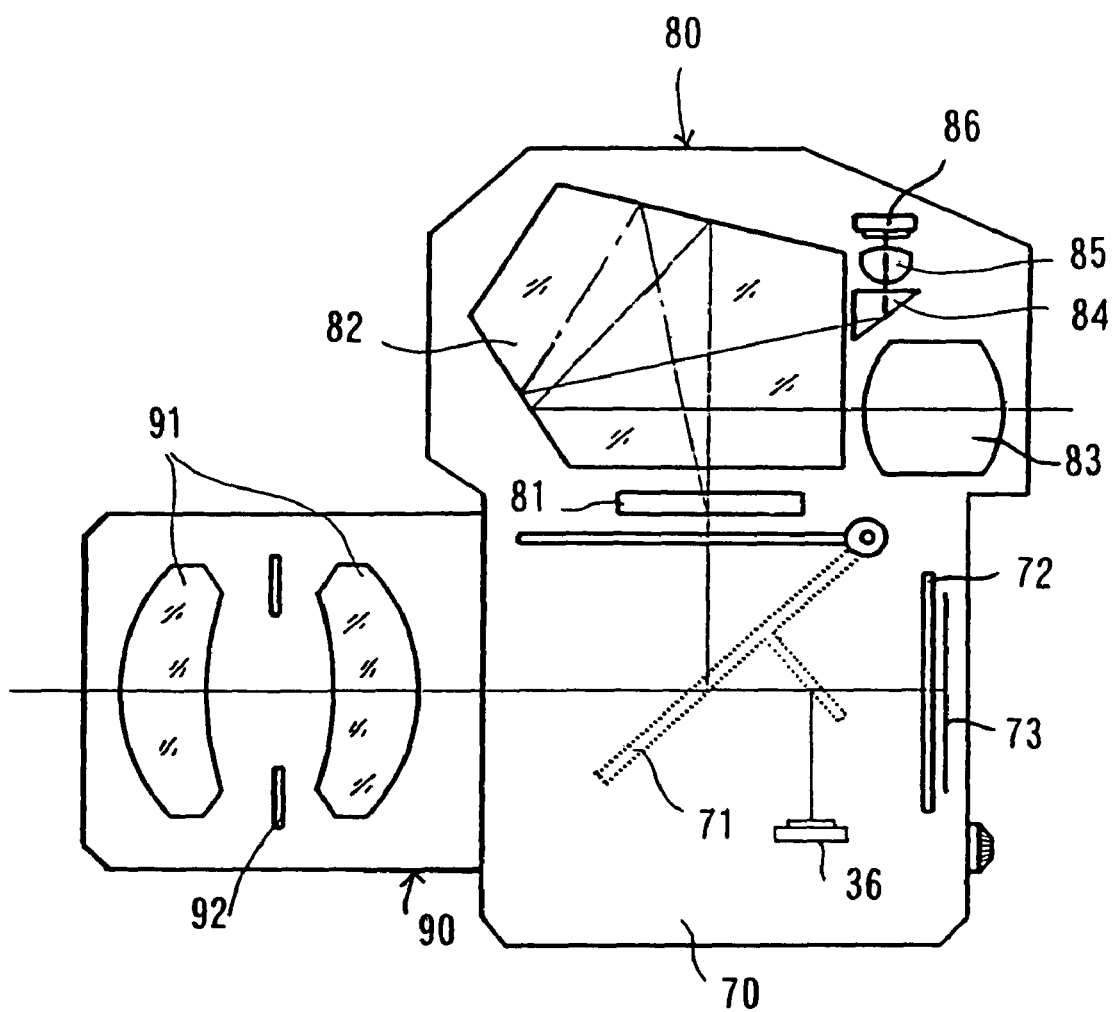
FIG. 1 illustrates the structure of an embodiment of a single lens reflex electronic still camera.

The following is an explanation of an embodiment of the present invention given in reference to the drawings. As illustrated in FIG. 1, the single lens reflex electronic still camera in this embodiment is provided with a camera main body 70, a viewfinder device 80 which is attached to or detached from the camera main body 70 and an interchangeable lens 90 internally provided with a taking lens 91 and an aperture 92, that is attached to or detached from the camera main body 70. Subject light passes through the interchangeable lens 90 to enter the camera main body 70 and is guided to the viewfinder device 80 by a quick return mirror 71 which is at the position indicated by the dotted line before a release to form an image at a viewfinder mat 81 and also to form an image at a focal point detection device 36. The subject image is further guided to an ocular lens 83 by a pentaprism 82. After a release, the quick return mirror 71 rotates to the position indicated by the solid line and the subject light forms an image on an image-capturing device 71 via a shutter 72. Prior to the release, the subject image enters a white balance sensor 86 through a prism 84 and an image-forming lens 85 so that the color temperature of the subject image is detected.

Figure 2:
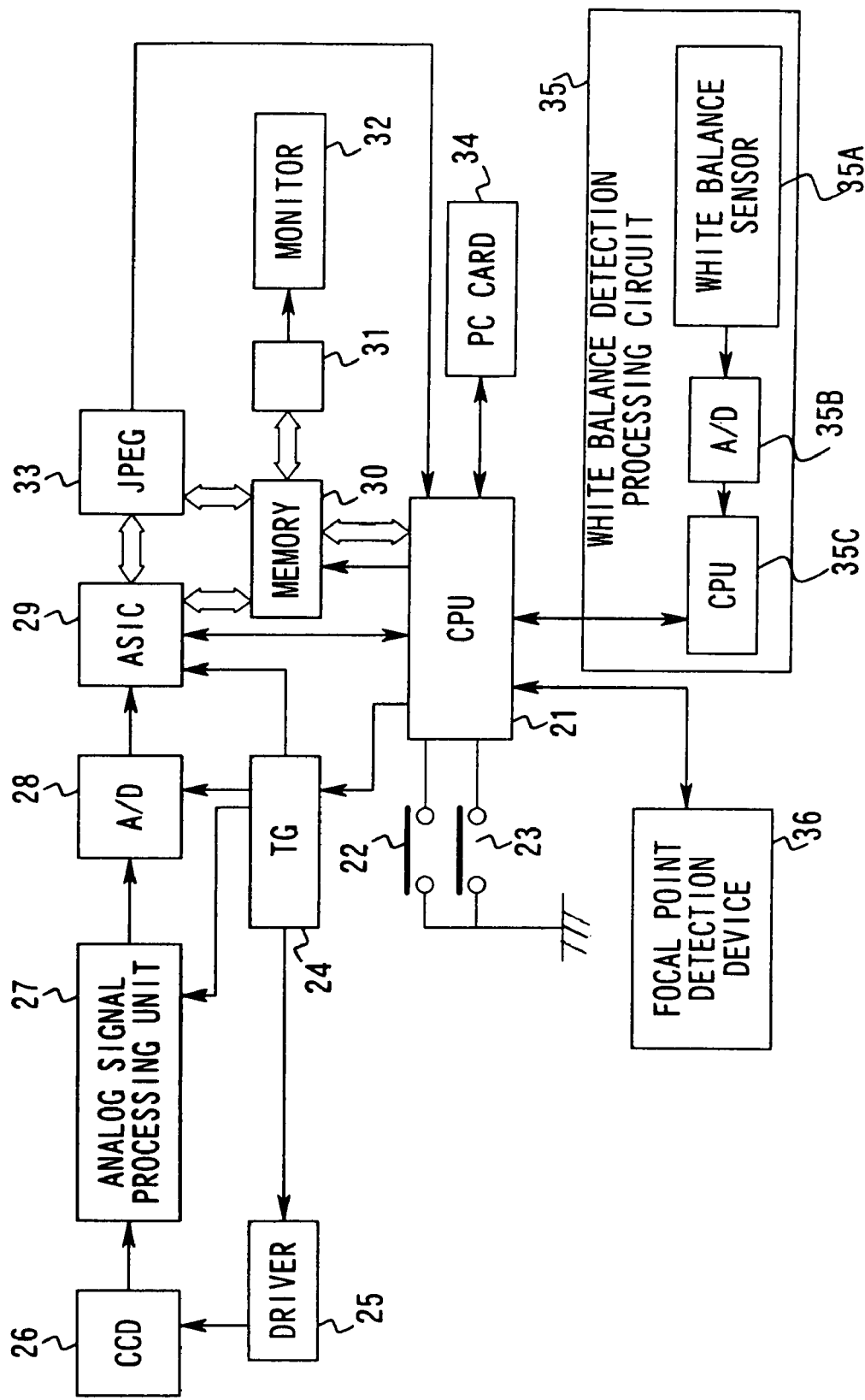
FIG. 2 is a block diagram of an embodiment of the signal processing system in the single lens reflex electronic still camera.

FIG. 2 is a circuit block diagram of the embodiment. A half-press signal and a full-press signal from a half-press switch 22 and a full-press switch 23 respectively both interlocking with a release button are input to a CPU 21. When the half-press switch 22 is operated and the half-press signal is input, the focal point detection device 36 detects the focal adjustment state at the taking lens 91 in response to a command issued by the CPU 21 and drives the taking lens 91 to the focus matching position so that the subject light entering the interchangeable lens 90 forms an image on the image-capturing device 73. As is to be explained in detail later, the focal point detection device 36 detects the state of focal adjustment for a focal point detection area at the center of the photographic image plane and each of the four focal point detection areas set to the left, to the right, above and below the central focal point detection area, and drives the taking lens 91 to the focus matching position based upon the focal adjustment status detected from the focal point detection area that has been selected based upon a preset algorithm. In addition, the drive of a CCD 26 of the image-capturing device 73 is controlled via a timing generator 24 and a driver 25. The timing generator 24 controls the operating timing of an analog processing circuit 27 and an A/D conversion circuit 28. Furthermore, a white balance detection processing circuit 35 starts driving in response to a signal provided by the CPU 21.

When the full-press switch 23 is turned on immediately after the half-press switch 22 is turned on, the quick return mirror 71 rotates upward, the subject light from the interchangeable lens 90 forms an image on the photosensitive surface of the CCD 26 and the signal charge that corresponds to the brightness of the subject image is stored at the CCD 26. The signal charge thus stored at the CCD 26 is caused to be swept out by the driver 25 and is input to the analog signal processing circuit 27 that includes an AGC circuit and a CDS circuit. After analog processing such as gain control and noise removal is performed on an analog image signal at the analog signal processing circuit 27, the signal is converted to a digital signal at the A/D conversion circuit 28. The signal achieved through the digital conversion is supplied to an image processing circuit 29 which may be constituted as, for instance, an ASIC, where the signal undergoes an image pre-treatment including white balance adjustment, profile compensation and gamma control.

The white balance detection processing circuit 35 includes a white balance sensor 35A (the white balance sensor 86 in FIG. 1) constituted as a color temperature sensor, an A/D conversion circuit 35B which converts the analog signal output by the white balance sensor 35A to a digital signal and a CPU 35C that generates a white balance adjustment signal based upon a digital color temperature signal. The white balance sensor 35A, which may be constituted of, for instance, a plurality of photoelectric conversion devices each demonstrating sensitivity to red color R, blue color B or green color G, receives the optical image of the entire photographic field. For instance, when the white balance sensor is constituted of a two-dimensional CCD provided over 24 rows×20 lines, the photosensitive area of the CCD may be divided into 16 areas with a plurality of elements demonstrating sensitivity to R, G and B arrayed in each area. The CPU 35C calculates the R gain and the B gain based upon the outputs from the plurality of photoelectric conversion devices. These gains are transferred to a specific register at the CPU 21 and are stored there.

The image data that have undergone the image pre-treatment further undergo format processing (image post-treatment) for JPEG compression and then the image data are temporarily stored in a buffer memory 30.

The image data stored in the buffer memory 30 are processed into display image data at a display image generation circuit 31 and are displayed on an external monitor 32 such as an LCD as the results of photographing. In addition, the image data stored in the buffer memory 30 undergo data compression at a specific rate through the JPEG method at a compression circuit 33 and are recorded in a storage medium (PC card) 34 such as a flash memory.

Figure 3:
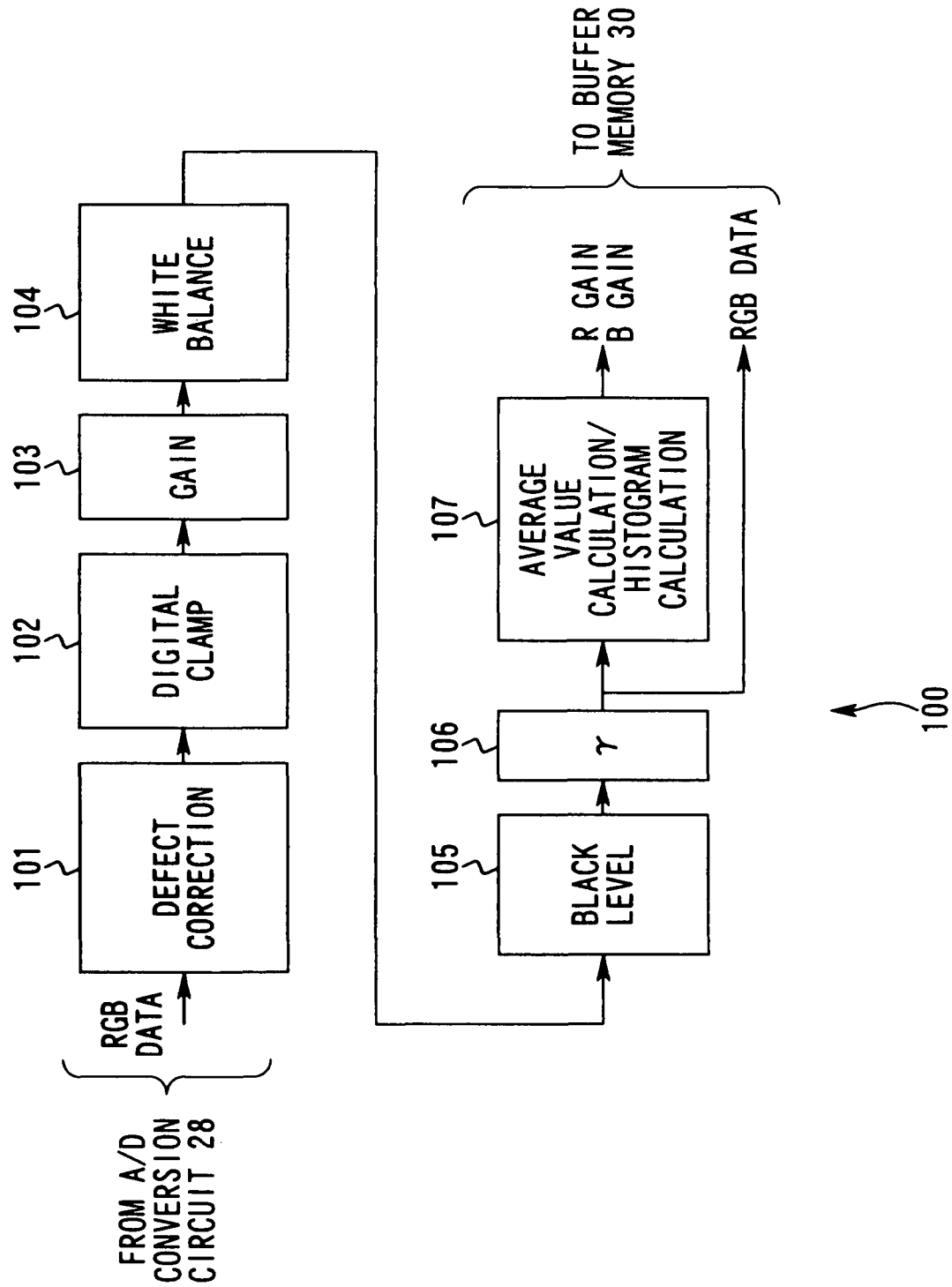
FIG. 3 is a block diagram illustrating the circuit that performs line processing in the signal processing system shown in FIG. 2.
Figure 4:
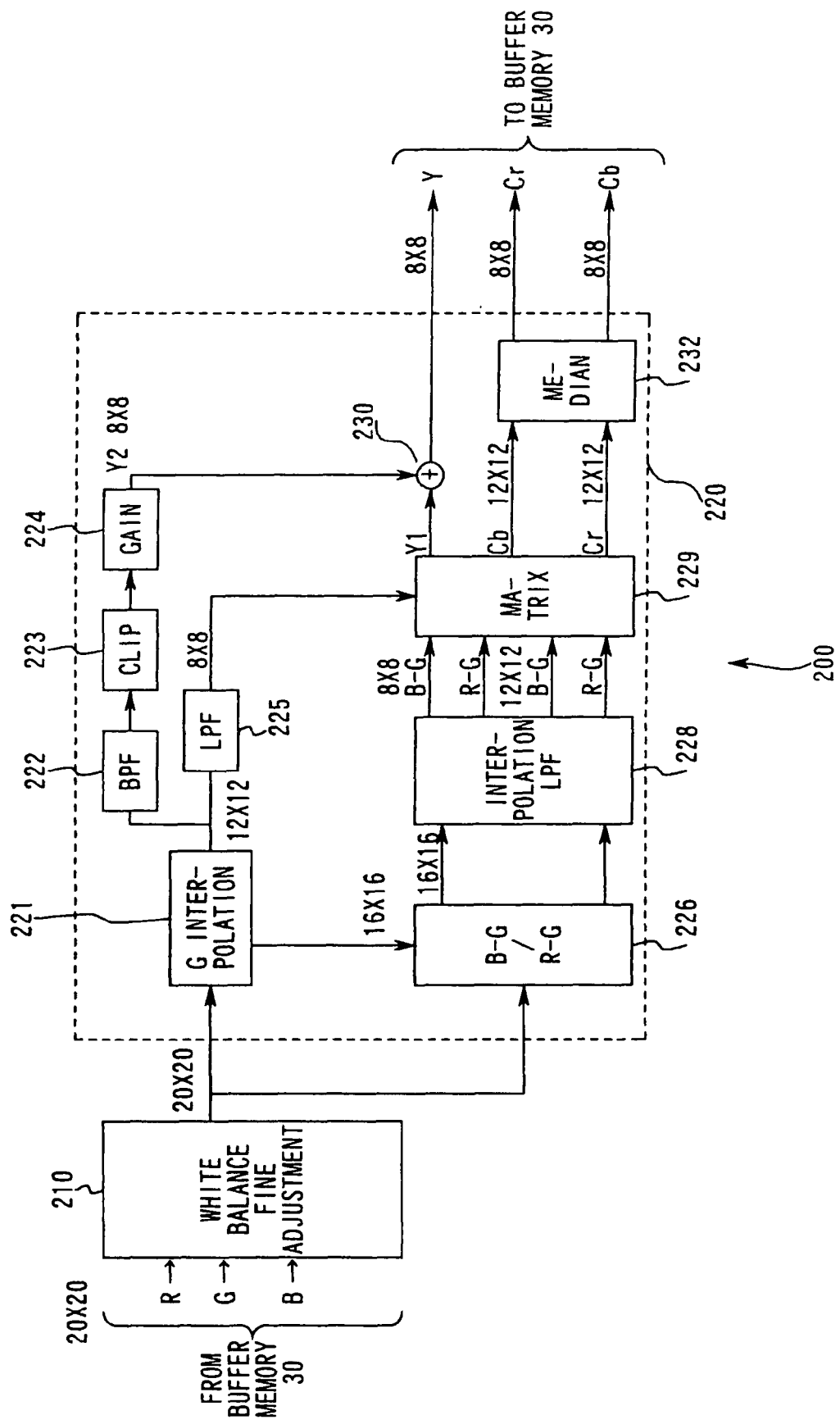
FIG. 4 is a block diagram illustrating the circuit that performs block processing in the signal processing system shown in FIG. 2.

FIGS. 3 and 4 are block diagrams illustrating the details of the image processing circuit 29. FIG. 3 shows a line processing circuit 100 that performs signal processing on the image data provided by the CCD 26 in units of individual lines, which undertakes the image pre-treatment described above. FIG. 4 illustrates a block processing circuit 200 that performs signal processing on image data having undergone the signal processing at the line processing circuit 100, in units of blocks corresponding to 20×20 pixel areas, 16×16 pixel areas, 12×12 pixel areas or 8×8 pixel areas, which undertakes the image post-treatment described above. It is to be noted that while the image processing circuit 29 is actually realized in software by employing a plurality of processors, it is explained as hardware in this specification to facilitate explanation.

The line processing circuit 100 in FIG. 3 performs various types of signal processing that are to be detailed later on 12-bit R, G and B signals output by the A/D conversion circuit 28 and is provided with a defect correction circuit 101, a digital clamp circuit 102, a gain circuit 103, a white balance circuit 104, a black level circuit 105, a gamma correction circuit 106 and an average value/histogram calculation circuit 107.

The defect correction circuit 101 corrects the data output from a pixel with a defect (specified in advance with its address set in a register) in the output of the CCD 26 in units of individual lines in pixel sequence. The digital clamp circuit 102 subtracts the weighted average of a plurality of sets of pixel data that are used as so-called optical black from each set of pixel data in a given line in the output from the CCD 26 in units of individual lines in pixel sequence. The gain circuit 103 uniformly applies a specific gain to each of the R, G and B signals output by the CCD 26 in units of individual lines in pixel sequence, implements inconsistency correction with regard to the sensitivity of the CCD 26 for the G signal and also implements inconsistency correction with regard to the sensitivity ratio of the CCD 26 for the R and B signals.

The white balance circuit 104 multiplies the R signal and the B signal in the output from the CCD 26 by the R gain and the B gain which constitute the white balance adjustment coefficients set in advance and stored in the register at the CPU 21 as explained earlier, in units of individual lines in pixel sequence. According to the present invention, as is to be explained later, gain for white balance fine adjustment is calculated based upon the image data corrected at the white balance circuit 104 to perform fine adjustment of the white balance. The black level circuit 105 adds a value set in advance and stored in the register at the CPU 21 to the R, G and B signals in the output from the CCD 26 in units of individual lines in pixel sequence. The gamma correction circuit 106 performs gamma correction on the output from the CCD 26 in units of individual lines in pixel sequence by using a gradation look-up table. It is to be noted that through the gamma correction, the 12-bit R, G and B signals are each converted to 8-bit data.

The average value/histogram calculation circuit 107 extracts image data corresponding to, for instance, 512×512 areas with the area at its center selected as a focal point detection area among the image data corresponding to the entire area that have undergone the gamma correction and calculates a gain RF-gain for white balance fine adjustment of the R signal and a gain BF-gain for white balance fine adjustment of the B signal using, for instance, the following formulae (1) and (2). The gains RF-gain and BF-gain are stored in the register. For instance, if color filters are provided on the 512×512 pixel area as illustrated in FIG. 5, the average values of the R signal, the G signal and the B signal may be calculated using formulae (3)~(5), to calculate the gains RF-gain and BF-gain for white balance fine adjustment using the ratio of the G signal average value Gave and the R signal average value Rave and the ratio of the G signal average value Gave and the B signal average value Bave as indicated in formulae (1) and (2).

$$RF\text{-gain}=G\text{ave}/R\text{ave} \quad (1)$$

$$BF\text{-gain}=G\text{ave}/B\text{ave} \quad (2)$$

$$\text{Here, } R\text{ave}=R\text{sum/number of } R \text{ pixels} \quad (3)$$

$$G\text{ave}=G\text{sum/number of } G \text{ pixels} \quad (4)$$

$$B\text{ave}=B\text{sum/number of } B \text{ pixels} \quad (5)$$

By adopting this averaging method, the gradation average values of the R signals, the G signals and the B signals in the image data are determined, which has proved through experience to improve the results of white balance adjustment (the overall white balance).

Figure 6:
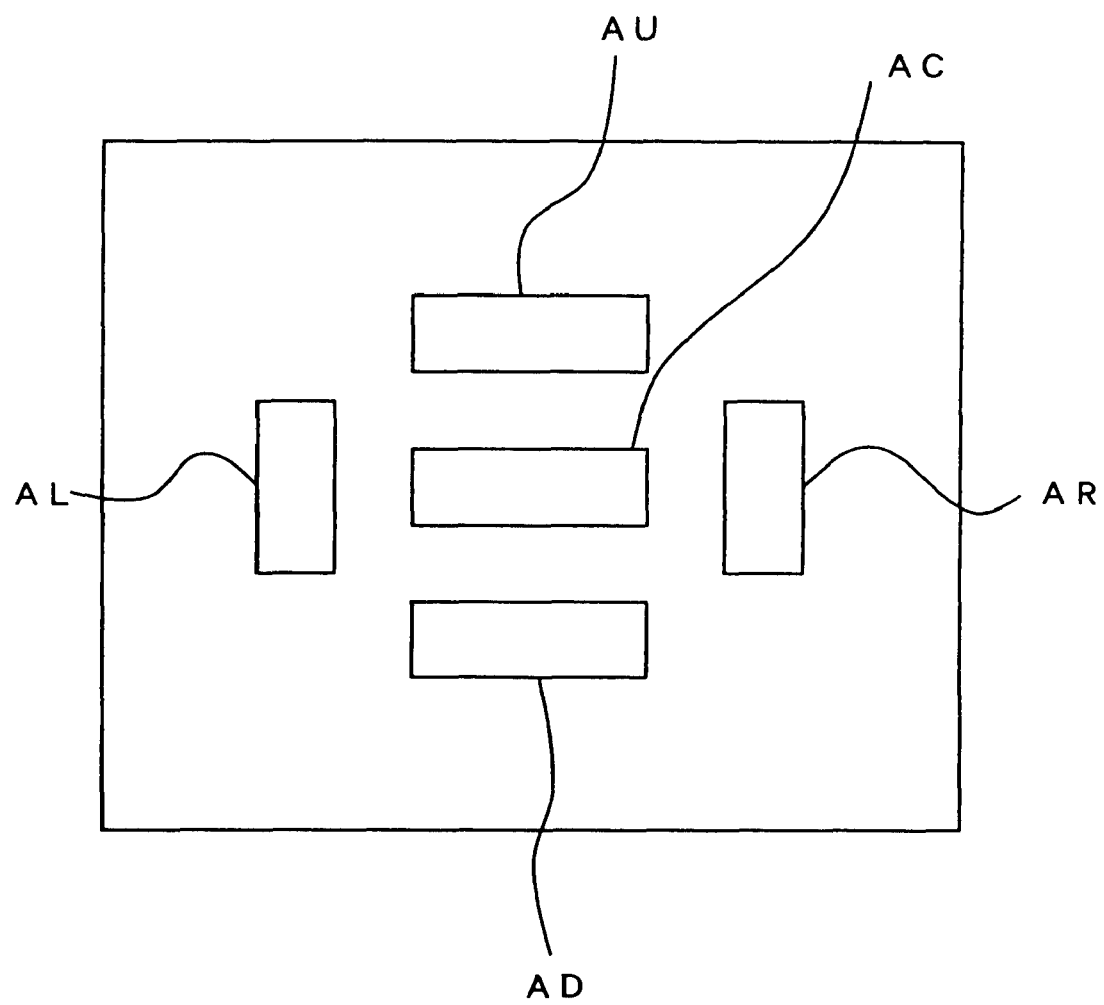
FIG. 6 shows an example of focal point detection area positional arrangement.

FIG. 6 illustrates an example of a positional arrangement of focal point detection areas. In this embodiment, an area AC located at the center of the image-capturing image plane, an area AR to the right viewed by the photographer, an area AL to the left, an area AU on the upper side and an area AD on the lower side are provided. One of these areas is selected based upon a preset algorithm and image data corresponding to 512×512 areas with the selected area located at the center are extracted. Based upon the extracted image data, the gain RF-gain for white balance fine adjustment of the R signal and the gain BF-gain for white balance fine adjustment of the B signal are calculated as described earlier.

Figure 7:
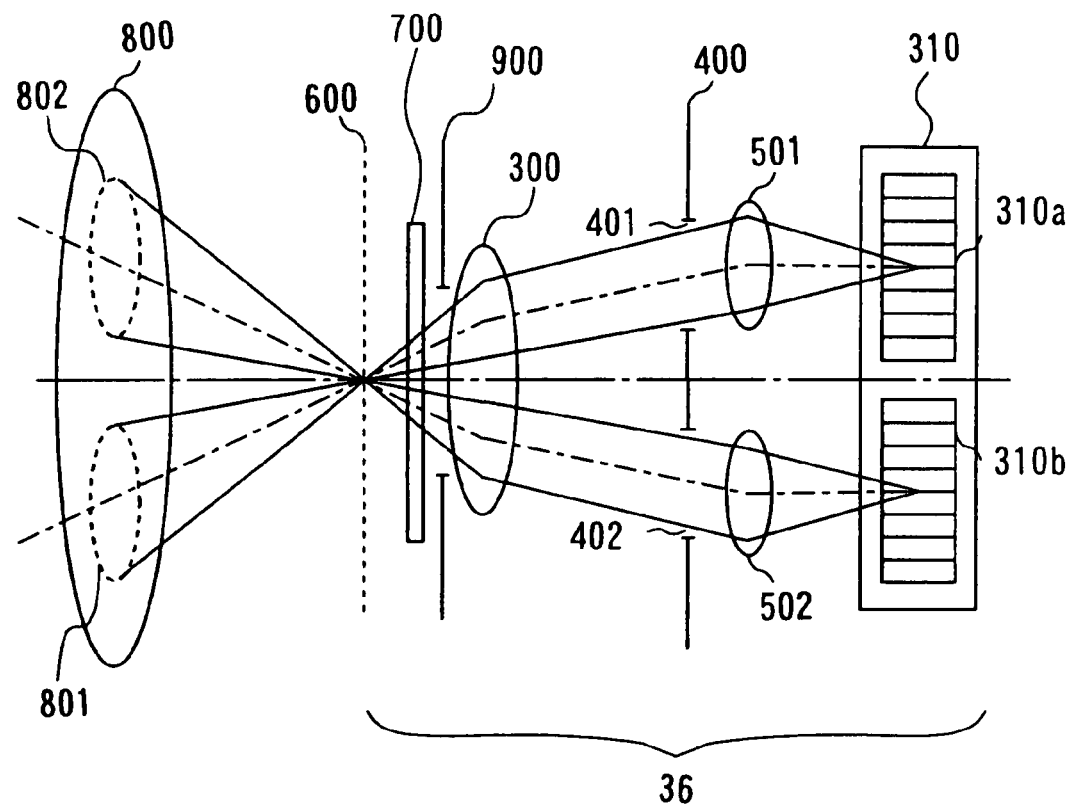
FIG. 7 illustrates the focal point detection device.

In reference to FIG. 7, the structure of the focal point detection device 36 and the principle of the focal point detection operation performed by the focal point detection device 36 are explained. The focal point detection device 36 comprises an infrared light blocking filter 700, a visual field mask 900, a field lens 300, an opening mask 400, image reforming lenses 501 and 502, an image sensor 310 and the like. An area 800 is the exit pupil of a taking lens 91 (see FIG. 1). In addition, in areas 801 and 802, the image achieved by reverse-projecting the opening portions 401 and 402 bored at the opening mask 400 on the area 800 by using the field lens 300, are present. It is to be noted that in FIG. 7, the infrared light blocking filter 700 may be located either on the right side or the left side of the field mask 900. The light fluxes entering via the areas 801 and 802 form a focal point on an image-capturing device equalizing surface 600, then travel through the infrared light blocking filter 700, the field mask 900, the field lens 300, the opening portions 401 and 402 and the image reforming lenses 501 and 502 and form an image on image sensor arrays 310a and 310b.

The pair of subject images formed on the image sensor arrays 310a and 310b move close to each other in a so-called front pin state in which a sharp image of the subject is formed by the taking lens 91 further frontward (toward the subject) relative to the image-capturing device equalizing surface 600, whereas they move further away from each other in a so-called rear pin state in which a sharp image of the subject is formed further rearward relative to the image-capturing device equalizing surface 600. In addition, when the subject images formed on the image sensor arrays 310a and 310b are away from each other by a specific distance, a sharp image of the subject is located on the image-capturing device equalizing surface 600. Thus, the focal adjustment status at the taking lens 91 can be calculated by converting the pair of subject images to electrical signals through photoelectric conversion performed at the image sensor arrays 310a and 310b and determining the relative distance between the pair of subject images through arithmetic processing on the signals. This focal adjustment status is calculated as the quantity of misalignment that indicates the direction in which and the distance over which the position of a sharp image formed by the taking lens 91 is located relative to the image-capturing device equalizing surface 600. In FIG. 7, the area in which the images on the image sensor arrays 310a and 310b which are projected in reverse by the image reforming lenses 501 and 502 overlap each other in the vicinity of the image-capturing device equalizing surface 600 corresponds to a focal point detection area. Through this method, the focal point is detected for each of the five areas within the photographic image plane.

The focal point detection device 36 makes a decision as to which selection area is to be selected for acquisition of focal point information during the actual image-capturing operation after focal points have been detected for the individual areas as explained above. For instance, the area in which the subject closest to the camera is captured may be selected among the plurality of areas. Then, the focal point detection data are utilized in a focal matching operation while image-capturing is in progress. In addition, the image data corresponding to 512×512 areas with the selected focal point detection area located at the center are extracted from the output signal from the white balance sensor 35A. Based upon the image data thus extracted, the gain RF-gain for white balance fine adjustment of the R signal and the BF-gain for white balance fine adjustment of the B signal are calculated.

Figure 8A:
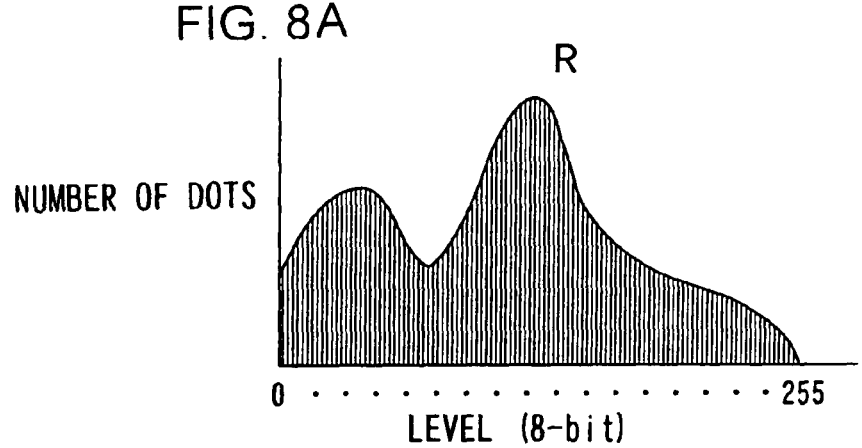
FIGS. 8A~8C illustrate histograms of R, G and B brightness.
Figure 8B:
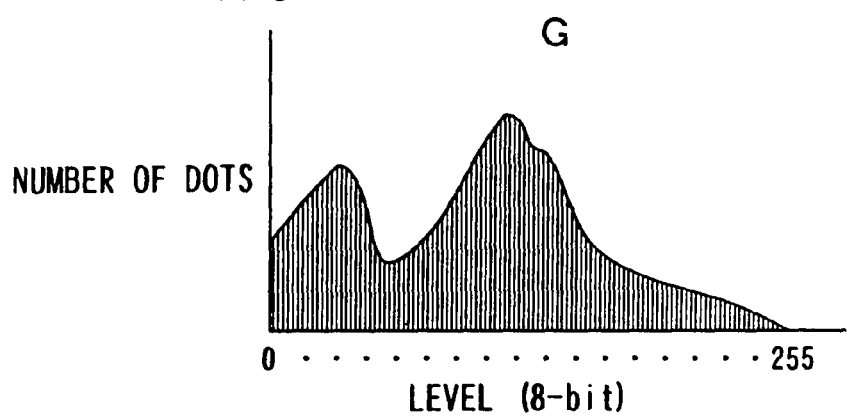
Figure 8C:
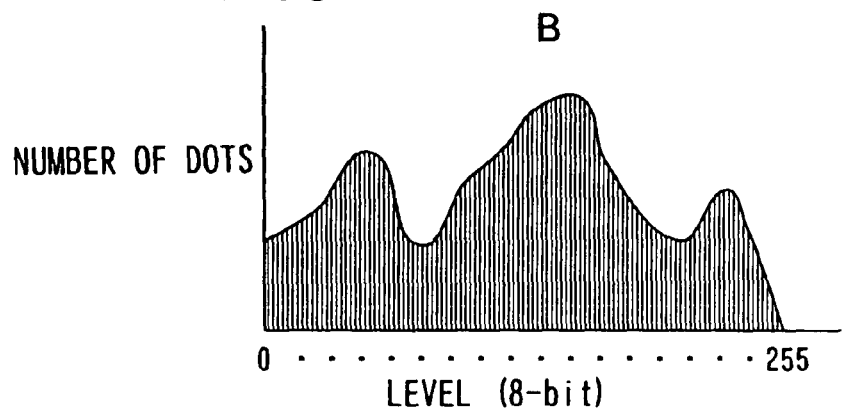

The gains RF-gain and BF-gain for white balance fine adjustment may be calculated as described below, based upon histograms of the brightness levels of the R, G and B signals calculated at the average value/histogram calculation circuit 107. The average value/histogram calculation circuit 107 calculates histograms of the brightness levels of the R, G and B signals. In other words, it obtains histograms as illustrated in FIGS. 8A-8C by calculating the quantities corresponding to individual brightness levels for the various colors. In this process, assuming that the 95% level values of the individual colors, i.e., R, G and B, are set, for instance, at R=180, B=200 and G=190, the RF-gain and BF-gain can be calculated as the white balance fine adjustment, RF-gain=190/180 and the white balance fine adjustment BF-gain=190/200. It is to be noted that a 95% level value is a brightness level value corresponding to the number of dots or pixels that is 95% of the entire number of G-signal dots.

By adopting this histogram method, histograms that contain dispersions of gradation distribution for the individual R, G and B signals in the image data are achieved, and by determining a white balance fine adjustment gain based upon the shape of the corresponding histogram, the white balance can be adjusted in a specific concentrated area (the area indicated by the white points) which is proved through experience to improve the results of white balance adjustment. It is to be noted that the averaging method and the histogram method may be used in combination.

The block processing circuit 200 in FIG. 4, which is constituted of a white balance fine adjustment circuit 210 and an interpolation/profile processing circuit 220, engages in various types of signal processing in units of n×m sets of pixel data, i.e., in blocks. The white balance fine adjustment circuit 210 performs white balance fine adjustment on R signals and B signals that have undergone the processing performed at the gamma correction circuit 106 and are stored in the buffer memory 30, by multiplying the R and B signals in each 20×20 pixel area block with the gains RF-gain and BF-gain for white balance fine adjustment calculated at the average value circuit 107.

The interpolation/profile processing circuit 220 is provided with a G interpolation circuit 221, a band pass filter (BPF) 222, a clip circuit 223, a gain circuit 224, a low pass filter (LPF) 225, a color difference signal generation circuit 226, an interpolation/low pass filter (LPF) circuit 228, a matrix circuit 229, an adder 230 and a median circuit 232. The interpolation/profile processing circuit 220 performs format processing for JPEG data compression for individual data blocks corresponding to 20×20 pixel areas in the image data having undergone white balance fine adjustment to generate Y signals corresponding to 8×8 pixel areas and Cb signals and Cr signals each corresponding to 8×8 pixel areas. A brightness signal Y contains a brightness signal Y1 indicating the low frequency component of the G signal and a profile extraction signal Y2 corresponding to the high frequency component of the G signal, as will be explained later.

Figure 9:
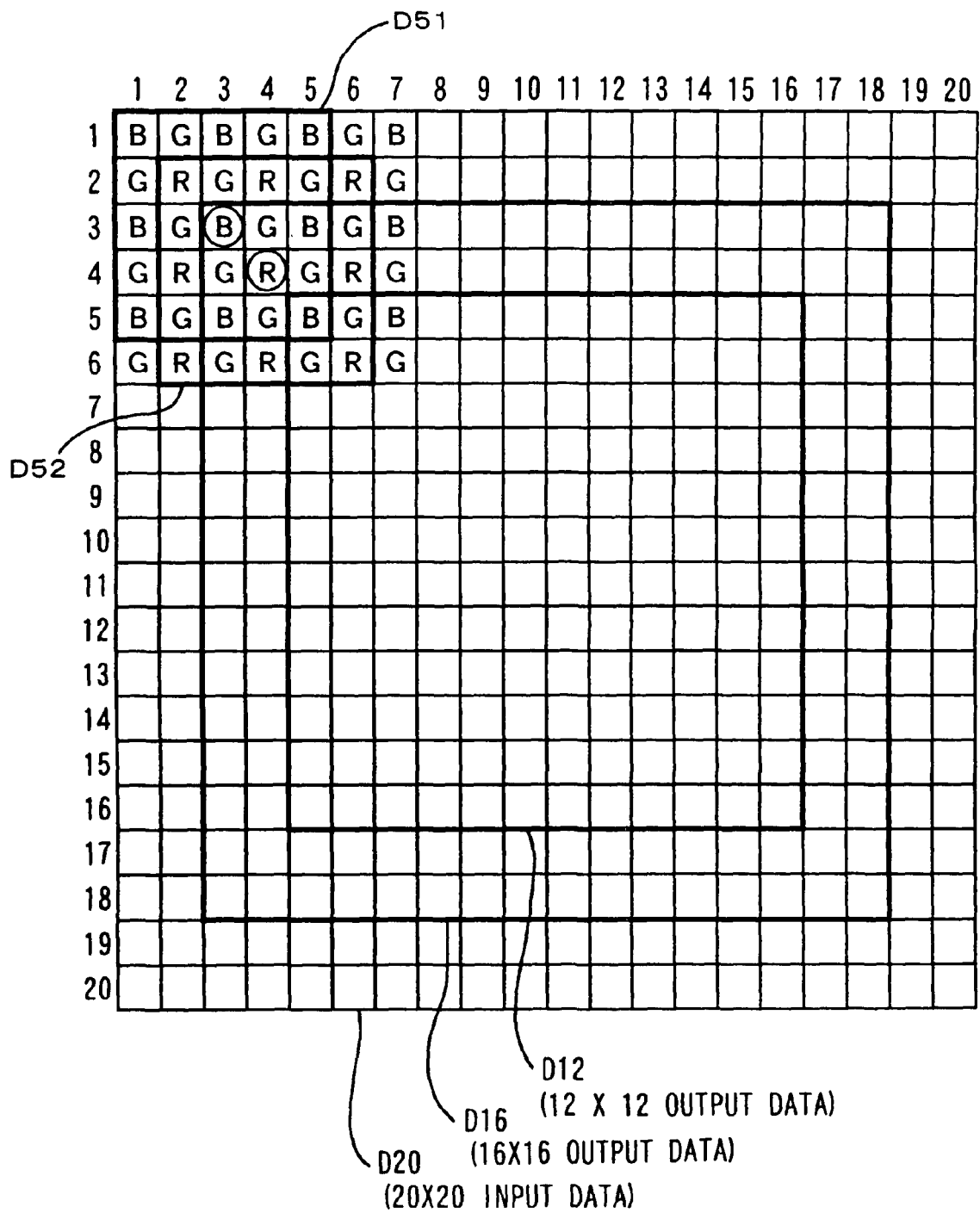
FIG. 9 illustrates the details of processing performed at the G interpolation circuit.

Block signals corresponding to 20×20 pixel areas output from the white balance adjustment circuit 210 are input to the G interpolation circuit 221 where the G component of each pixel area corresponding to an R signal or a B signal is calculated through an interpolation operation for the data corresponding to the central 16×16 pixel area. Namely, as illustrated in FIG. 9, the G component at the vacant lattice point (the pixel at line 3, row 3, where a B signal is obtained) at the center of D51 representing a 5×5 pixel area data block (line 1, row 1~line 5, row 5) is calculated for input data D20 corresponding to 20×20 pixel areas. This value is used as a substitute for the G component of the pixel (encircled B) at line 3, row 3 in output data D16 corresponding to 16×16 pixel areas.

Next, the G component at the vacant lattice point (the pixel at line 4, row 4, where an R signal is obtained) at the center of data D52 representing a 5×5 pixel area block (line 2, row 2~line 6, row 6) is used as a substitute for the input data D20 corresponding to the 20×20 pixel areas, and this value is converted as the G component of the pixel (encircled R) at line 4, row 4 in the output data D16 corresponding to 16×16 pixel areas. By performing this processing repeatedly, G interpolation processing is implemented for all the vacant lattice points in the 16×16 pixel area so that the output data D16 are obtained. Then, while output data D12 corresponding to 12×12 pixel areas in the output data D16, are output to the band pass filter 222 and the low pass filter 225, the output data D16 corresponding to the 16×16 pixel area are output to the color difference signal generation circuit 226.

Figure 10:
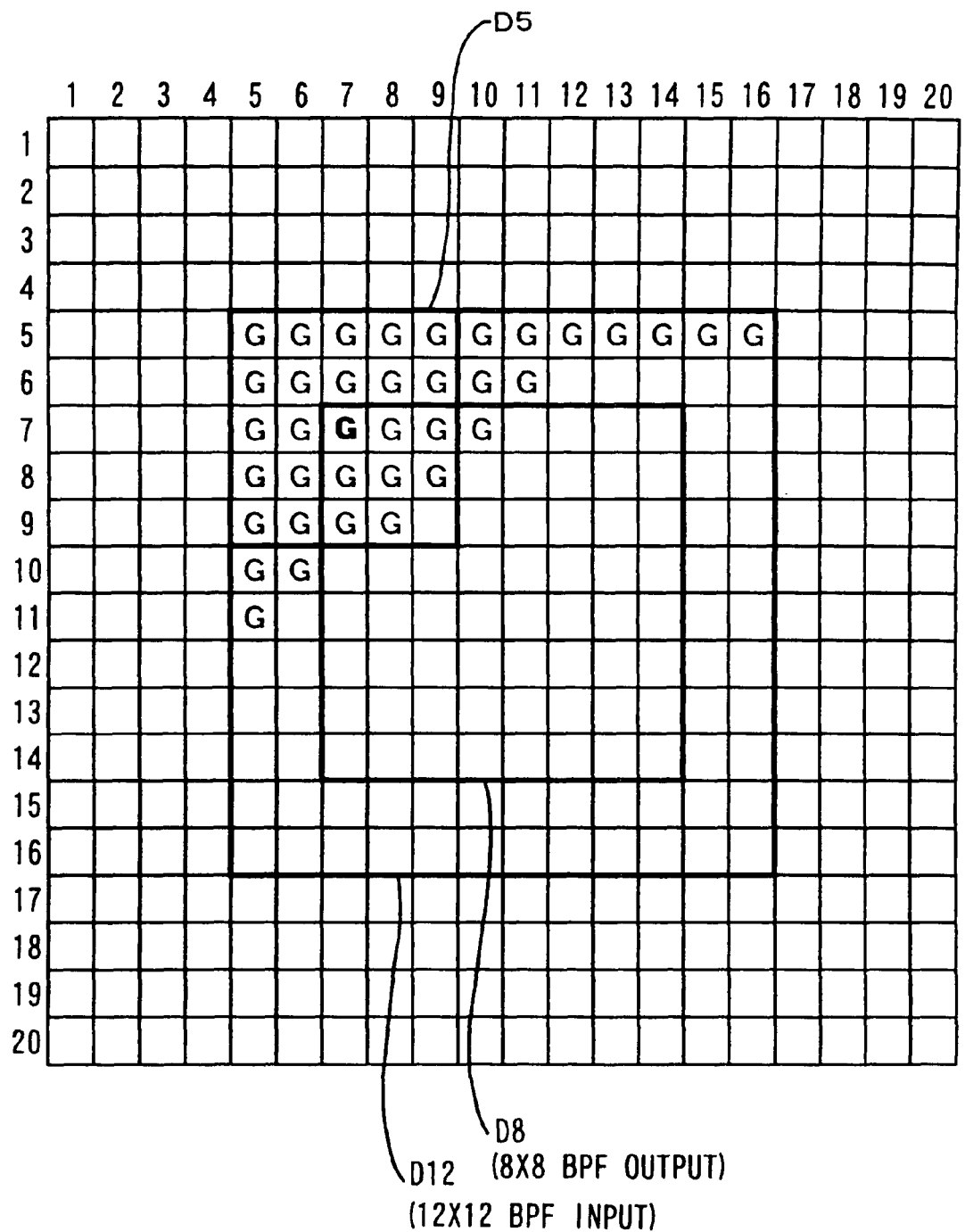
FIG. 10 illustrates the details of the processing performed at the band-pass filter.

The band pass filter 222 extracts the intermediate frequency component (a frequency component that is high enough to allow extraction of the subject profile and is referred to as the high frequency component for convenience) in the G signal in the 12×12 pixel area block output by the G interpolation circuit 221. Namely, as illustrated in FIG. 10, BPF output data are obtained by multiplying data corresponding to a 5×5 pixel area D5 (line 5, row 5~line 9, row 9) with band pass filter coefficients in input data D12 corresponding to the 12×12 pixel areas, and the value of the BPF output data is used as a substitute for data (bold letter G) at line 7, row 7 in the output data D8 corresponding to an 8×8 pixel area block. By repeating this processing, all the pixel data in the 8×8 pixel area block are converted to G data that have undergone BPF, to generate output data D8.

The clip circuit 223 clips and cuts each set of data D8 corresponding to an 8×8 pixel area block output by the band pass filter 222 at a preset level. The gain circuit 224 multiplies the output from the clip circuit 223 with a preset gain.

Figure 11:
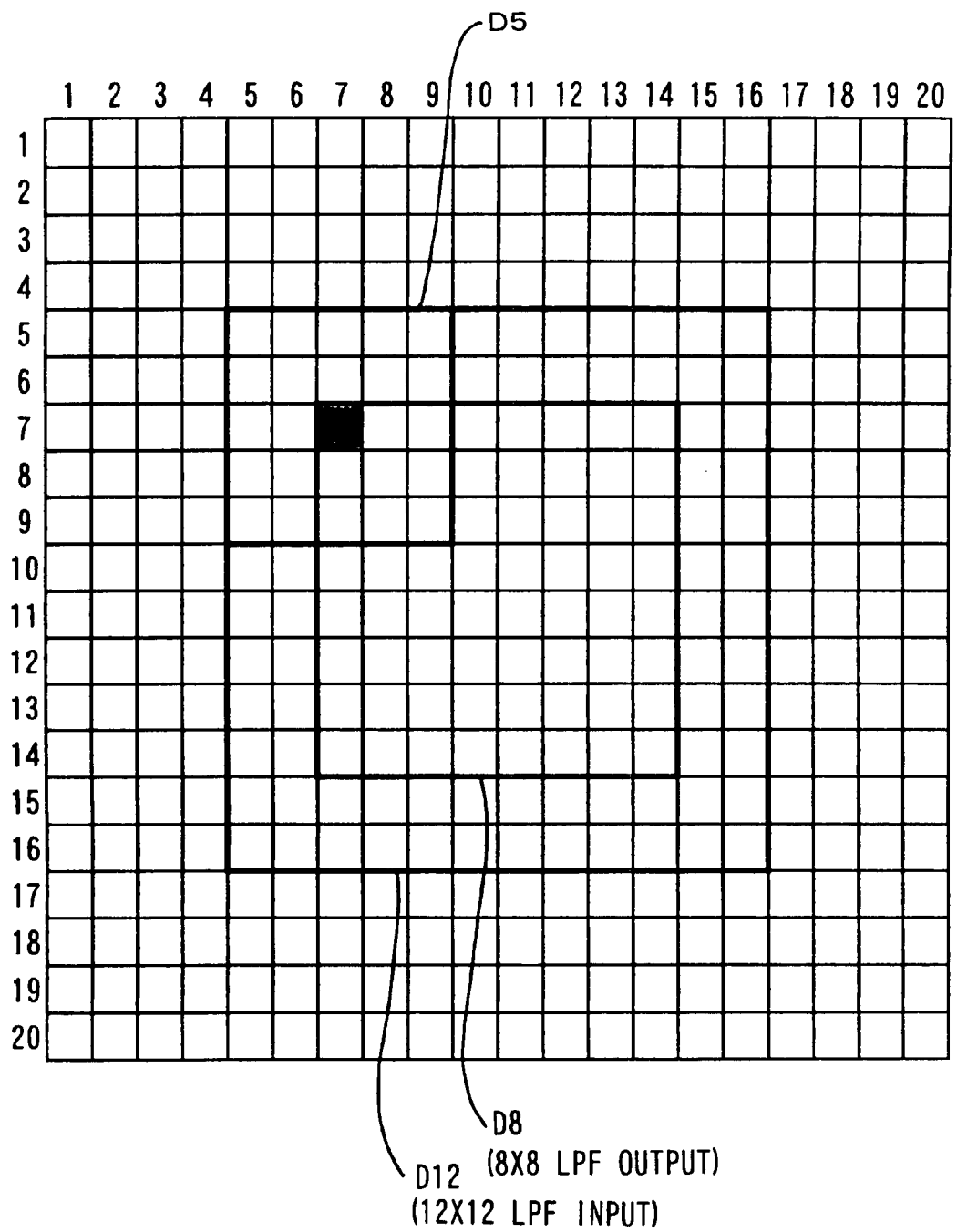
FIG. 11 illustrates the details of the processing performed at the low pass filter.

The low pass filter 225 extracts the low frequency component in the G signals in the 12×12 pixel area block output by the G interpolation circuit 221. Namely, as illustrated in FIG. 11, LPF output data are obtained by multiplying the 5×5 pixel area data D5 (line 5, row 5~line 9, row 9) in the input data D12 corresponding to the 12×12 pixel areas with a low pass filter coefficients, and the value of the LPF output data is substituted for data at line 7, row 7 (hatched area) in the output data D8 corresponding to the 8×8 pixel area block. By repeating this processing, all the pixel data corresponding to the 8×8 pixel area block are used as a substitute for the G data that have undergone LPF, to generate output data D8.

As illustrated in FIG. 12, the color difference signal generation circuit 226 generates intermediate data D16-3 that contain (B-G) signals and (R-G) signals based upon RGB signal input data D16-1 corresponding to a 16×16 pixel area block, which are the output from the white balance fine adjustment circuit 210 and G signal input data D16-2 corresponding to the 16×16 pixel area block, which are the output from the G interpolation circuit 221. In addition, it separates the intermediate data D16-3 into (B-G) color difference signal output data D16-4 and (R-G) color difference signal output data D16-5.

8-bit (B-G) signals and (R-G) signals corresponding to 16×16 pixel areas are input to the interpolation/LPF circuit 228 from the color difference signal generation circuit 226 to enable interpolation calculation at the interpolation/LPF circuit to obtain (B-G) signals and (R-G) signals in units of 5×5 pixel area blocks, the interpolation/LPF circuit also performs low pass filtering processing to extract a low band signal and outputs the resulting (B-G) signals and (R-G) signals corresponding to the 12×12 pixel areas to Cb, Cr matrix portions of the matrix circuit 229. In addition, it outputs (B-G) signals and (R-G) signals corresponding to 8×8 pixel areas to a Y matrix portion of the matrix circuit 229.

When the (R-G) data corresponding to a 5×5 pixel area block are as presented in FIG. 13, the interpolation calculation and the low pass filtering processing calculation described above are performed as expressed in the following formula (6).

$$\text{Interp } R - \tag{6}$$
$$G(i, j) = [\{R - G(i-2, j-2) + R - G(i+2, j-2) + R - G(i-2,$$
$$j+2) + R - G(i+2, j+2)\} \times kc1 + \{R - G(i-2, j-2) +$$
$$(R - G(i+2, j-2) + R - G(i-1, j+2) + R - G(i+1, j+2)\} \times$$
$$kc2 + \{R - G(i, j-2) + R - G(i, j+2)\} \times kc3 +$$

-continued
$$\{R - G(i-2, j-1) + (R - G(i+2, j-1) + R - G(i-2, j+1) + R - G(i+2, j+1)\} \times kc4 +$$
$$\{R - G(i-1, j-1) + (R - G(i+1, j-1) + R - G(i-1, j+1) + R - G(i+1, j+1)\} \times kc5 +$$
$$\{R - G(i, j-1) + (R - G(i, j+1) \times kc6 +$$
$$\{R - G(i-2, j) + R - G(i+2, j)\} \times kc7 +$$
$$\{R - G(i-1, j) + (R - G(i+1, j) \times kc8 +$$
$$\{R - G(i, j) \times kc9] / (2^{\wedge} Ktr - g)$$

Here kc1-kc9, and Ktr-g each represents a coefficient.

In general, when interpolation filtering and band-restriction LPF are implemented at the same time, the following restriction is imposed in regard to the filter coefficient. The explanation here is given in one-dimensional terms for purposes of simplification. Let us now consider a situation in which an actual sample point is present in N cycles among interpolated sample points, e.g., a,a,b,b,a,a,b,b, . . . (a represents an actual sample point and b represents a sample point to be interpolated. In this example, an actual sample point is present in four cycles.) When the sample points are to be interpolated using an odd-number degree symmetrical digital filter of degree (2n+1) ((2n+1) is larger than N), since the sample points after the interpolation, too, must be uniform if the actual sample points are uniform, the following restrictions in regard to the filter coefficients are applied.

With C(k) representing the kth filter coefficient, the sums of coefficients in N sets of coefficients must be equal to one another, as expressed below.

$$2\Sigma C(N \times i) = \Sigma[C(N \times i + 1) + C(N \times i + N - 1)]$$
$$\vdots$$
$$= \Sigma[C(N \times i + k) + C(N \times i + N - k)]$$

Here, i represents an integer equal to or greater than 0 which contains the filter coefficient equal to or less than 2n+1 and k represents an integer smaller than n and equal to or greater than 0.

In the case of two-dimensional processing, filters to which similar restrictions applied may be multiplied together in the horizontal direction and the vertical direction to constitute a two-dimensional filter. Since sample points are interpolated over 2-pixel cycles, as illustrated in FIGS. 5 and 13 in this embodiment, N=2 and the sum of filter coefficients in an even-number degree and the sum of filter coefficients in an odd-number degree must be equal to each other. Namely, $$\Sigma C(2 \times i) = \Sigma C(2 \times i + 1)$$

When a degree 5×degree 5 symmetrical type filter as expressed in formula (6) above is employed in two-dimensional processing, $$4 \times kc1 + 2 \times kc3 + 4 \times kc5 + 2 \times kc7 + kc9 = 4 \times kc2 + 4 \times kc4 + 2 \times kc6 + 2 \times kc8$$

Figure 14:
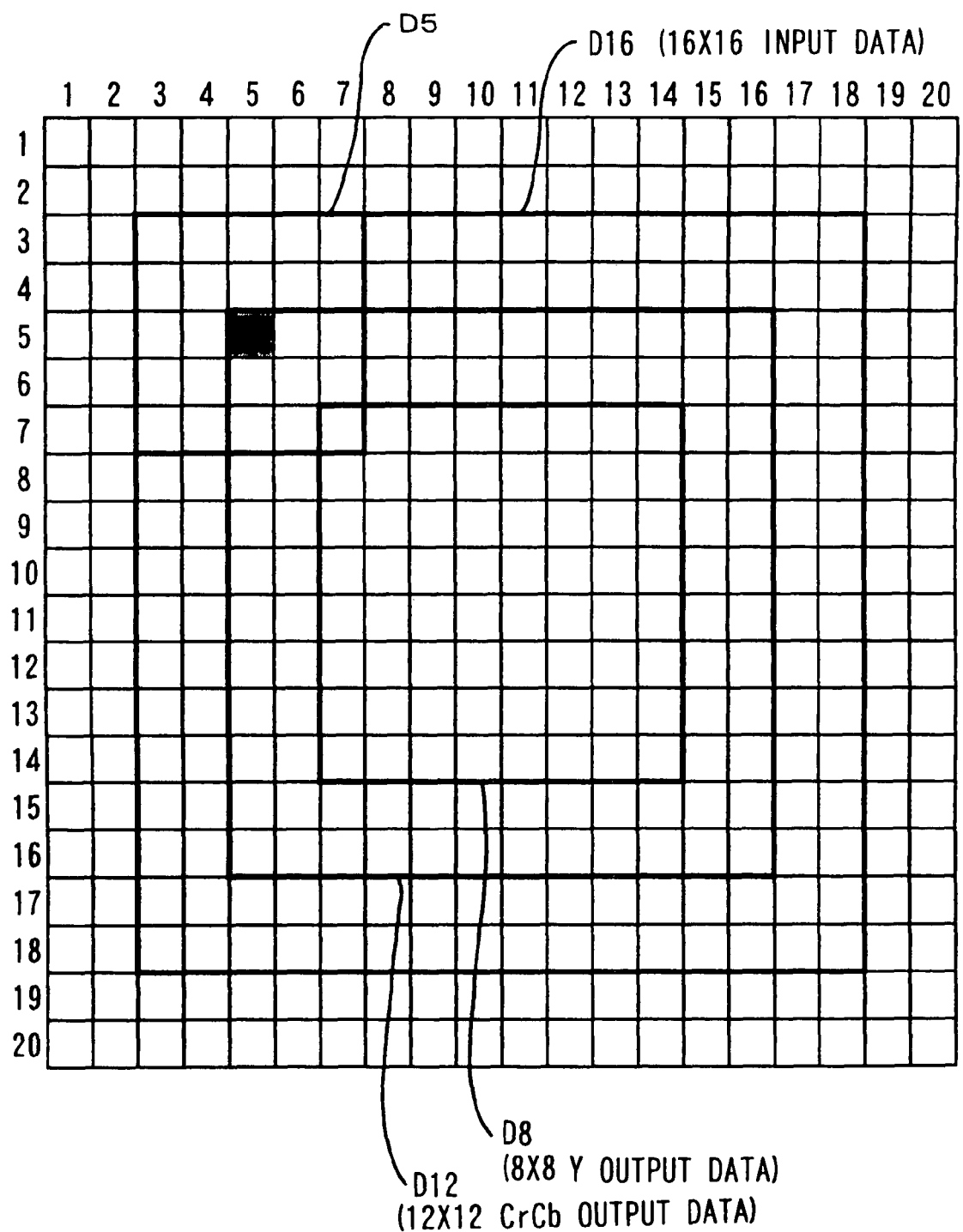
FIG. 14 illustrates the details of the processing performed at the interpolation/LPF circuit.

Now, an explanation is given on interpolation/LPF processing on (R-G) signals as an example in reference to FIG. 14. For the (R-G) signals in input data D16 corresponding to 16×16 pixel areas, (R-G) data D5 corresponding to a 5×5 pixel area block (line 3, row 3~line 7, row 7) are multiplied with interpolation/LPF filter coefficients to calculate (R-G) data representing the central area (at line 5, row 5), and these (R-G) data are used as a substitute for data in output data D12 corresponding to a 12×12 pixel area block. By performing this processing repeatedly, the interpolation/LPF processing is performed on all the pixel data corresponding to the 12×12 pixel area block as far as the (R-G) signals are concerned so that output data D12 are obtained. Similar processing is performed for the (B-G) signals, as well, to generate output data corresponding to the 12×12 pixel area block.

The matrix circuit 229 is constituted of the Y matrix portion, the Cb matrix portion and the Cr matrix portion. The Y matrix portion, to which (B-G) signals and (R-G) signals corresponding to the 8×8 pixel area block are input from the interpolation/LPF circuit 228 and G signals corresponding to the 8×8 pixel area block are input from the low pass filter 225, generates brightness signals Y1 each having a low frequency component corresponding to an 8×8 pixel area through the following formula (7).

$$Y1(i,j) = [Mkg \times G(i,j) + Mkr1 \times R-G(i,j) + Mkb1 \times B-G(i,j)] \quad (7)$$

Here, Mkg, Mkr1 and Mkb1 each represents a matrix coefficient.

The Cb matrix portion and the Cr matrix portion, to which (B-G) signals and (R-G) signals corresponding to the 12×12 pixel area block are respectively input from the interpolation/LPF circuit 228, generate Cb signals and Cr signals corresponding to the 12×12 pixel area block through the following formulae (8) and (9).

$$Cr(i,j) = Mkr2 \times R-G(i,j) + Mkb2 \times B-G(i,j) \quad (8)$$

$$Cb(i,j) = Mkr3 \times R-G(i,j) + Mkb3 \times B-G(i,j) \quad (9)$$

Here, Mkr2, Mkr3, Mkb2 and Mkb3 each represents a matrix coefficient.

The adder 230 adds together the brightness signal Y1 with the low frequency component corresponding to one of the 8×8 pixel areas output by the matrix circuit 229 and a profile extraction signal Y2 with the high frequency component corresponding to the 8×8 pixel areas output by the gain circuit 224. The profile extraction signal Y2 output by the gain circuit 224 is obtained by extracting only the high-frequency component in the G signal in a 16×16 pixel area having undergone the G interpolation, i.e., by extracting the profile. As a result, by adding the brightness signal Y1 calculated through the formula (7) and the profile extraction signal Y2 calculated at the gain circuit 224, at the adder 230, the brightness/profile extraction signals Y (Y1+Y2) for the entire image are calculated. The results of the addition are stored in the buffer memory 30.

The median circuit 233, to which Cb signals and Cr signals corresponding to 12×12 pixel areas output by the matrix circuit 229 are input, engages in median processing which is performed by using 9 points, i.e., 3×3 pixels contained in the 5×5 pixel area block to output Cr signals and Cb signals corresponding to 8×8 pixels.

Figure 15:
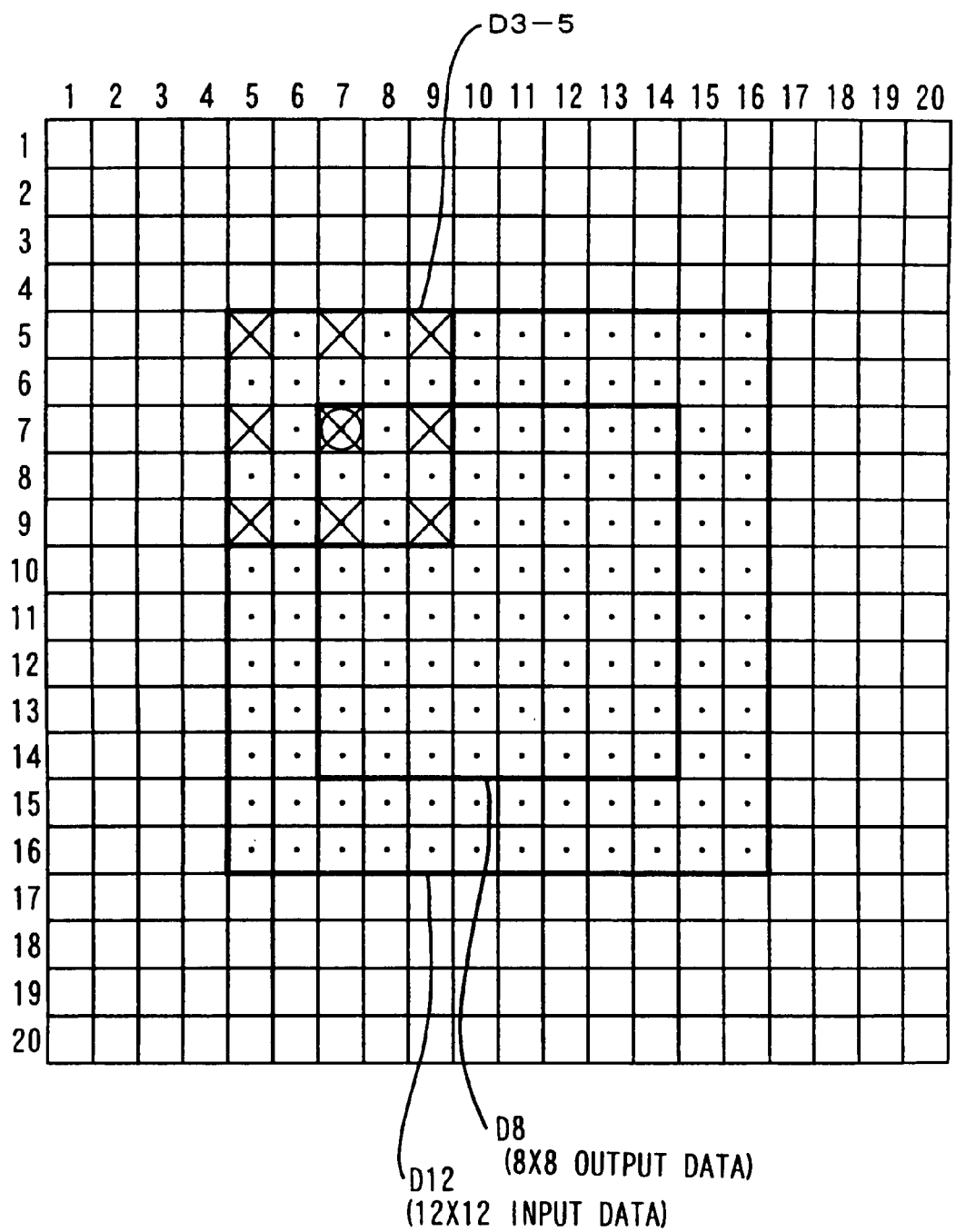
FIG. 15 illustrates the details of the processing performed at the median circuit.

In the median processing in this embodiment, median filtering processing is performed on 9 sets of data (indicated by ×) corresponding to 3×3 pixels and contained in data D3-5 corresponding to the 5×5 pixel areas (line 5, row 5~line 9, row 9) in the 12×12 pixel data D12 (indicated by the black dots) as illustrated in FIG. 15. Namely, the 9 sets of data are sorted in ascending order or descending order and the central value is used as median processing data. Then, the median processing data thus obtained are used as a substitute for data corresponding to line 7, row 7 in the output data D8 corresponding to 8×8 pixels. By performing this arithmetic operation repeatedly, output data D8 corresponding to the 8×8 pixels are generated for both the Cb signals and the Cr signals. The output data D8 with the Cb signals and the Cr signals are stored in the buffer memory 30.

The JPEG compression circuit 33 repeats the process in which a single unit of YCrCb signals formatted to correspond to the 8×8 pixels to facilitate the JPEG compression method based upon the Y signals corresponding to 8×8 pixels generated by the adder circuit 230 and the Cr signals and the Cb signals corresponding to the 8×8 pixels generated by the median circuit 232 is extracted from input data corresponding to each 20×20 pixel area block input to the block processing circuit 20 and the extracted data are compressed through the procedure in the known art, until the entire image is compressed. The compressed image data are stored in the PC card 34 via the CPU 21.

Figure 16:
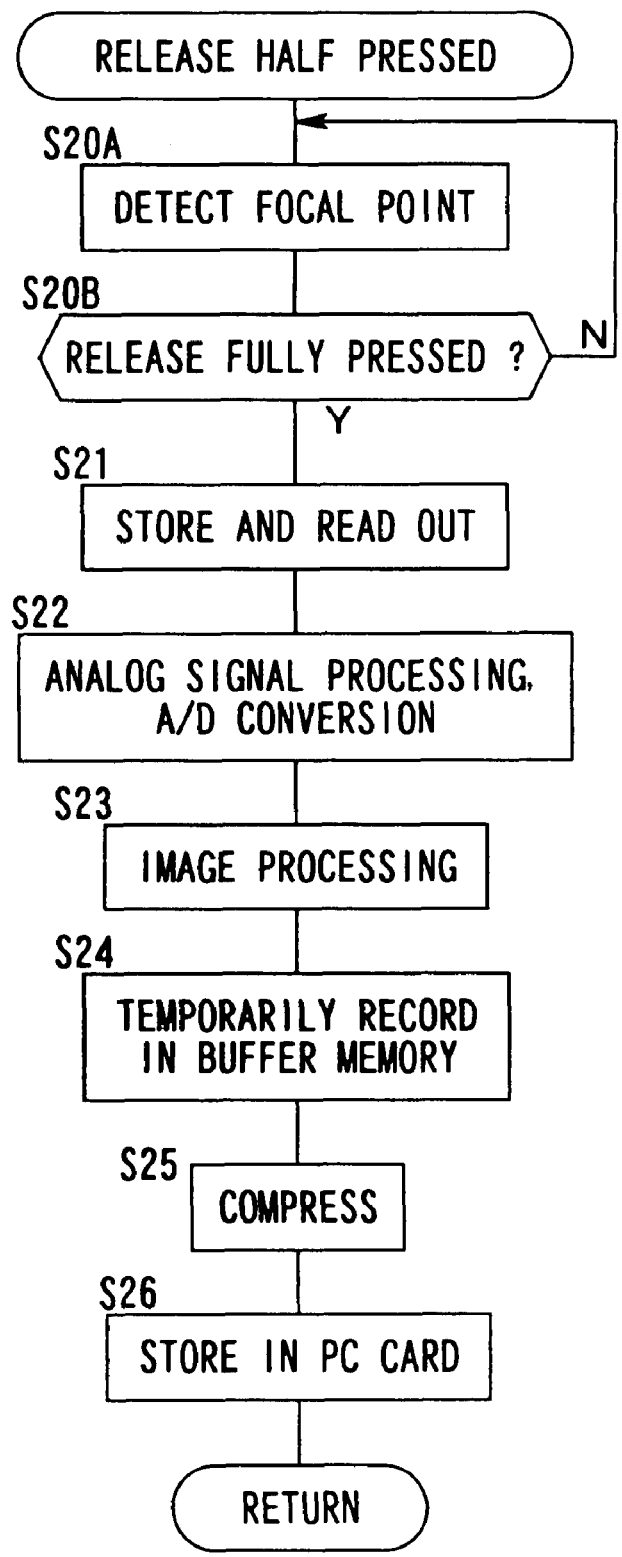
FIG. 16 is a flowchart of a program started up by the half-press switch.

The operation of the electronic still camera structured as described above is now explained. When the half-press switch 22 is operated, the focal point detection device 36 detects the focal adjustment status for each focal point detection area in step S20A. If it is decided in step S20B that the full-press switch 23 has been operated, the quick return mirror swings upward, and the program that implements the photographing sequence in FIG. 16 is executed. In step S21, each pixel at the CCD 26 stores a light-reception signal and when the storage is completed, the electrical charges stored at all the pixels are sequentially read out. In step S22, the image data that have been read out undergo the processing performed at the analog signal processing circuit 27 and then are converted to digital image data at the A/D conversion circuit 28 to be input to the image processing circuit 29. Then, the operation proceeds to step S23 in which processing such as white balance adjustment, gamma gradation control and JPEG formatting processing is performed at the image processing circuit 29. When the image processing is completed, the operation proceeds to step S24 to temporarily store the image data having undergone the image processing in the buffer memory 30. In step S25, the image data are read from the buffer memory 30 and the data are compressed at the JPEG compression circuit 33. In step S26, the compressed image data are stored in the PC card 34.

The functions and advantages achieved through this embodiment are explained in further detail.

Figure 17:
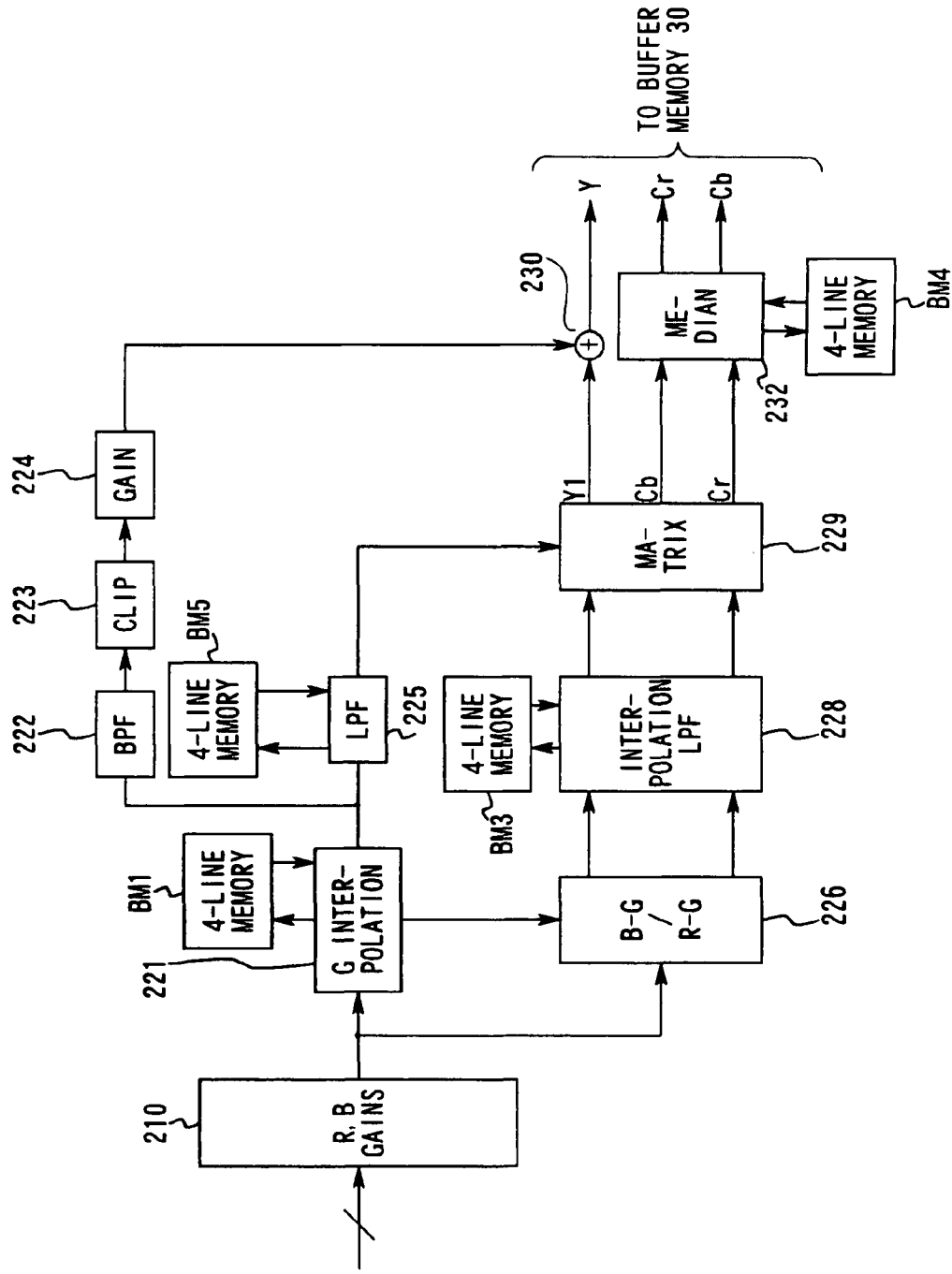
FIG. 17 is a block diagram of the JPEG format processing achieved through line processing instead of block processing.

(1) The line processing circuit 100 illustrated in FIG. 3 performs the signal processing that can be implemented in units of individual pixels and in units of individual lines. Namely, the line processing circuit 100 performs output processing for data in pixel sequence in units of lines in correspondence to the data output by the CCD 26. Then, the data having undergone the line processing are temporarily stored in the buffer memory 30, and the subsequent signal processing is performed at the block processing circuit 200 in units of individual n×m (n,m=20,16,12,18) pixel blocks. Thus, the line buffer does not need to become large even in a high image quality electronic still camera having more than 2 million pixels. In other words, unlike in this embodiment, if signal processing is not performed in units of blocks, buffer memories BM1~BM4 each corresponding to four lines, will be required for the G interpolation processing, the BPF processing, the interpolation/LPF processing and the median processing circuit, as illustrated in FIG. 17, which will obviously result in an increase in the circuit scale. When the processing is realized in hardware, a reduction in size and cost are realized. Since line processing instead of block processing is implemented to perform pipeline arithmetic operation which is executed in units of individual pixels and in units of individual lines, the pipeline arithmetic operation can be performed quickly, as in the prior art.

(2) Since RF-gain for white balance fine adjustment and BF-gain for white balance fine adjustment are calculated as expressed in formulae (1) and (2) based upon an image having undergone white balance adjustment performed using predetermined white balance adjustment coefficients R gains and B gains and white balance fine adjustment is performed on image data having undergone white balance adjustment using the RF-gains and BF-gains, the occurrence of color-casted image can be prevented even if defective adjustment of the predetermined white balance adjustment coefficients occurs.

(3) Since the white balance fine adjustment coefficients are calculated using an image data in one area selected from the preset plurality of focal point detection areas in each of which each subject presents, white balance fine adjustment for the main subject is enabled. In addition, even if defective white balance adjustment occurs due to an aberration of the lens at the periphery of the photographic image plane, the white balance fine adjustment can be implemented based upon image data containing the area so that any occurrence of color-casted image can be prevented.

(4) Since the interpolation/LPF circuit 228 performs interpolation calculation for (B-G) signals and (R-G) signals and also performs low pass filtering processing to extract the low frequency components at the same time, the length of time required for the processing is reduced compared to a method in which signals are processed in the order of the interpolation processing, the matrix processing and the LPF processing to suppress false colors and color moire. In addition, it is possible to do without hardware and, since the total frequency response can be controlled in one processing, ease of control is achieved.

(5) Since the median processing is performed on the Cr image data and the Cb image data corresponding to 8×8 pixels before performing JPEG compression, false colors and color moire can be suppressed more effectively within a shorter period of time compared to a method in the prior art in which false colors and color moire are suppressed entirely through low pass filtering. In addition, when generating Cr and Cb signals corresponding to 8×8 pixels through the JPEG compression format processing, median processing is performed on nine sets of data corresponding to 3×3 pixels at alternate positions in the horizontal direction and the vertical direction extracted from the 5×5 pixel area block for both the Cb signals and Cr signals, in the 12×12 pixel data having undergone the interpolation/LPF processing and the matrix processing. Therefore, the length of time required for the median processing can be reduced compared to the length of time required when performing median processing on all the 25 sets of data corresponding to 5×5 pixels.

While the explanation has been given on an electronic still camera in reference to the embodiments above, the line processing circuit 100 or the block processing circuit 200 may be realized in the form of software by storing an image processing program in a storage medium such as a CD ROM or a floppy disk which can be utilized when performing image processing on a personal computer. In this case, image data that have undergone image-capture at the CCD and digitization should be stored in a large-capacity image data storage medium, and with this storage medium set in a personal computer to take in the image data, the line processing or the block processing described earlier should be performed using the image processing program. For instance, the output data from the black level circuit 105 in FIG. 3 may be stored as raw data at the PC card 34 so that image processing can be performed on the raw data by setting the PC card 34 in the personal computer.

Figure 18:
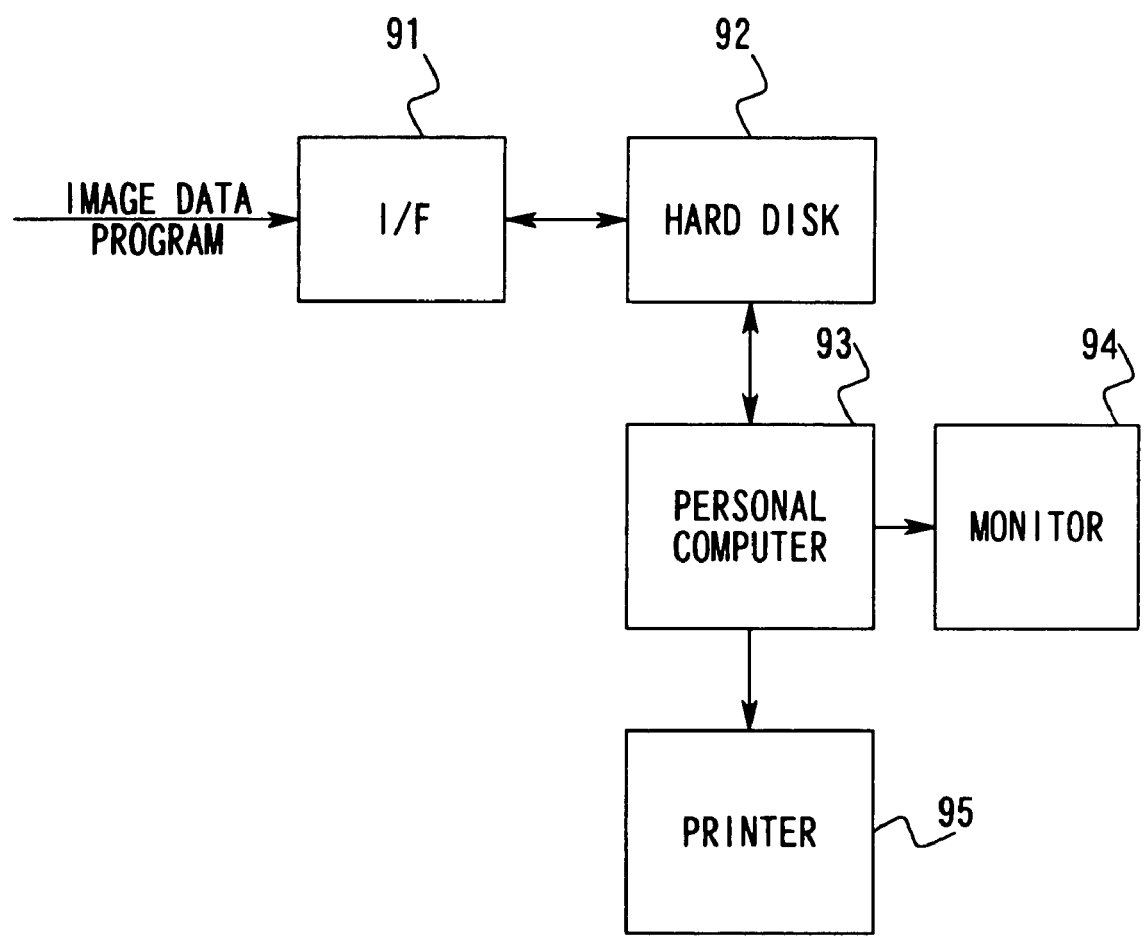
FIG. 18 is a block diagram of a configuration that allows image processing to be performed by taking raw image data into a personal computer.

FIG. 18 is a block diagram illustrating a configuration for using a personal computer to perform image processing as described above and to store the data in a storage device. Raw data of an image which has been captured in advance (output data from the black level circuit 105, for instance) are taken into a hard disk device 92 via an I/F circuit 91. In addition, a program for implementing the image processing described above via the I/F circuit 91 is stored in the hard disk device 92. The program may be stored in any of a variety of storage media, and by setting such a storage medium in a driver (not shown), the program is taken into the hard disk device 92. Alternatively, by connecting the hard disk device 92 or a personal computer 93 to the internet via the I/F circuit 91, a program may be downloaded via the internet.

Image processing as described above is performed by the personal computer 93 in FIG. 18 so that the image can be displayed on a monitor 94 or can be printed out by a printer 95. Compressed image data are stored in the hard disk device 92.

When performing image processing on a personal computer as described above, the program should be structured so that if the image data stored in the image data storage medium have already undergone white balance adjustment, only white balance fine adjustment processing is to be performed. In this case, information in regard to the focal point detection area utilized for the focus matching operation of the taking lens among the preset plurality of focal point detection areas should be also stored in the image data storage medium, so that the information can be utilized when selecting data corresponding to an image area related to the focal point detection area during the image processing performed on the personal computer. If, on the other hand, the image data stored in the image data storage medium have not yet undergone white balance adjustment, the program should be structured so that both the white balance adjustment processing and the white balance fine adjustment processing are implemented. In this case, the image-capturing data from the CCD, the color temperature information with respect to the subject detected at the white balance sensor 86 (35A) and the information with respect to the focal point detection area described above should also be stored in the image data storage medium so that the white balance adjustment processing and the white balance fine adjustment processing can be performed based upon these data.

The invention further includes, as another aspect, the control program (described above) that can be executed by the controller (e.g., a computer) to control the image processing apparatus as described above. The control program can be implemented in an application specific integrated circuit (ASIC). Alternatively, the control program can be transmitted by a carrier wave over a communications network such as, for example, the World Wide Web, and/or transmitted in a wireless fashion, for example, by radio waves or by infrared waves. The control program can also be transmitted by a carrier wave from a remote storage facility to a local control unit. In such an arrangement, the local control unit interacts with the remote storage facility to transfer all or part of the program, as needed, for execution by the local unit. Accordingly, or alternatively, the control program can be fixed in a computer-readable recording medium such as, for example, a CD-ROM, a computer hard drive, RAM, or other types of memories that are readily removable or intended to remain fixed within the computer.

It is to be noted that while the explanation has been given above in reference to a single lens reflex electronic still camera, the present invention may be adopted in an electronic still camera which does not allow lens exchange or in a digital video camera that is capable of taking in dynamic images as well. In addition, while the explanation has been given above on an example adopting the JPEG compression method, the present invention may be adopted when other compression methods are used. The other compression methods referred to here include compression achieved through the TIFF method, compression achieved through the Fractal method and compression achieved through the MPEG method. It is to be noted that the format processing as mentioned in this specification is not restricted to the format processing performed prior to the various types of compression processing described above, and may include non-compression TIFF format processing as well.

The circuit structures in the embodiments explained above merely represent examples and the circuit structure may assume the following modes, for instance.

(1) In reference to the G interpolation processing, the BPF processing, the LPF processing and the interpolation/LPF processing performed by the block processing circuit 200, the explanation has been given on the assumption that image processing is performed in units of individual blocks each constituted of 20×20, 16×16, 12×12 or 8×8 pixel areas. However, in the various types of processing, the image processing only needs to be performed in units of 5×5 image data blocks.

(2) While the closest focal point detection area among a plurality of focal point detection areas is automatically selected to calculate the gains RF-gain and BF-gain for white balance fine adjustment, the algorithm used for this selection process is not restricted to this example. Furthermore, the photographer may manually select one focal point detection area among the five focal point detection areas. In addition, white balance fine adjustment coefficients may be calculated using image data for a specific area with an area corresponding to a photometric area selected from a plurality of photometric areas located at its center. Moreover, an area may be specified using a touch sensor on, for instance, a monitor screen, so that white balance fine adjustment coefficients are calculated for the image data within a specific area defined based upon the image data within the specified area to perform white balance fine adjustment using the white balance fine adjustment coefficients on the next image data sampled.

In the electronic still camera described above, two types of data assuming different formats, i.e., irreversible compressed data obtained through JPEG or the like that have undergone a series of image processing and raw data output by the image-capturing device, can be recorded. The raw data are constituted of the 8-bit RGB data transmitted from a stage preceding the gamma control circuit 106 in FIG. 3, e.g., the white balance circuit 104 or the black level circuit 105, to the buffer memory 30. The irreversible compressed data are obtained by compressing the raw data through the JPEG method by using the brightness Y data, the color difference Cr, Cb data output by the block processing circuit 200.

Figure 19:
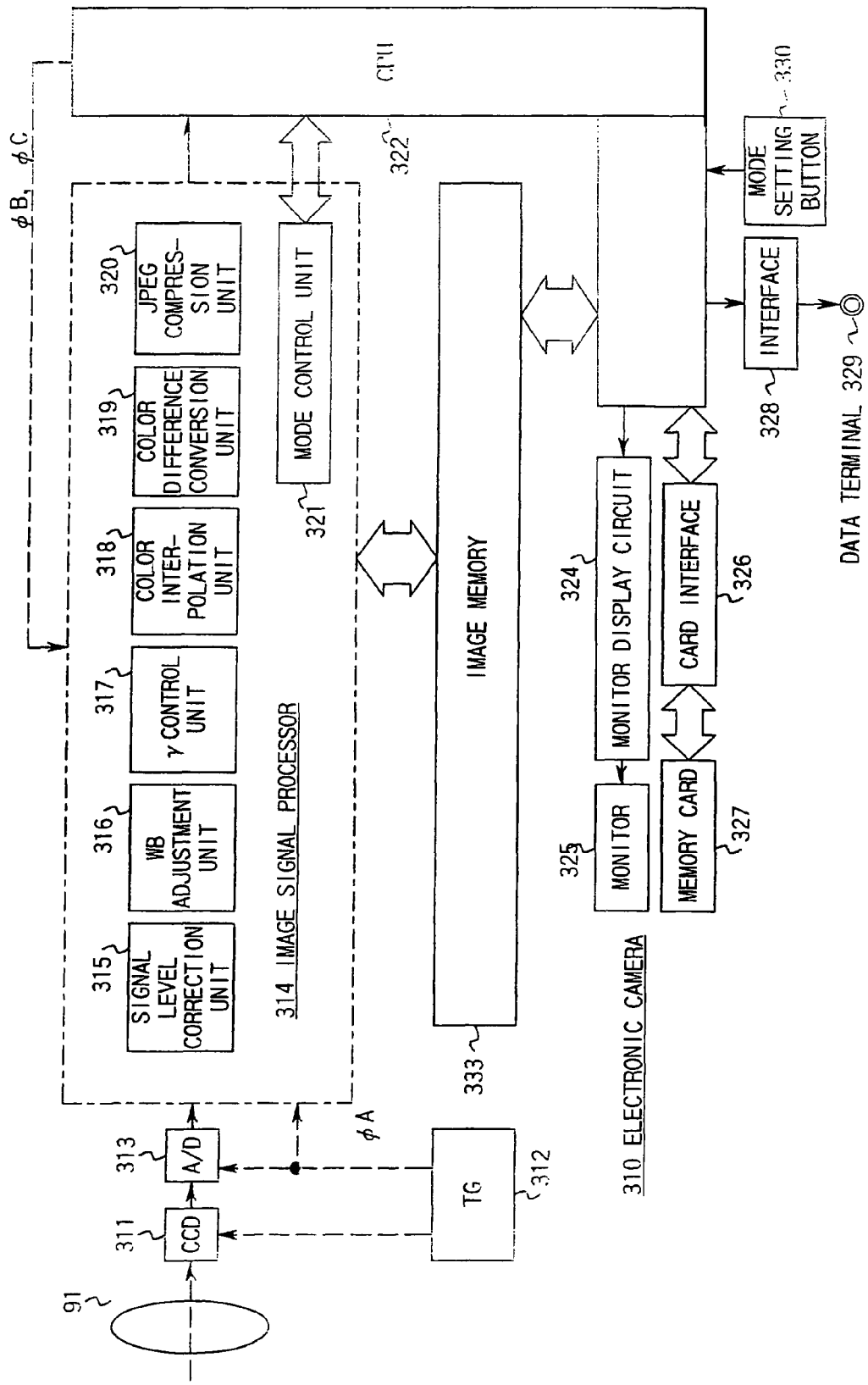
FIG. 19 is a block diagram illustrating the structure of the electronic camera in another embodiment of the present invention.

FIG. 19 is a structural block diagram of an electronic camera 310 that is capable of recording data in the two different data formats described above in another embodiment. In FIG. 19, a taking lens 91 is mounted at the electronic camera 310. A light-receiving surface of an image-capturing device 311 is placed in the image space of the taking lens 91. A timing generator 312 supplies a control pulse for controlling the storage, the discharge, the read and the like of the electronic charges to the image-capturing device 311.

Image data output by the image-capturing device 311 are input to an image signal processor 314 via an A/D conversion unit 313. The timing generator 312 supplies the A/D conversion unit 313 and the image signal processor 314 with an operation clock ØA.

The functions of the image signal processor 314 are achieved by adopting a configuration constituted of a signal level correction unit 315, a white balance adjustment unit 316, a gamma control unit 317, a color interpolation unit 318, a color difference conversion unit 319, a JPEG compression unit 20 and a mode control unit 21.

Image data output by the image signal processor 314 are input to a CPU 322. The CPU 322 transmits setting information for the operation mode to the mode control unit 321 in the image signal processor 314 and also supplies the image signal processor 314 with two operation clocks ØB and ØC.

An image memory 323 for temporarily storing image data is provided in the electronic camera 310. The image signal processor 314 and the CPU 322 access the image memory 323 via their own separate data buses. A monitor 325 for displaying monitor images which is connected to the CPU 322 via a monitor display circuit 24 is provided at the electronic camera 310.

The electronic camera 310 is provided with a card interface 326 connected to the CPU 322, which is detachably mounted with a memory card 327, a data terminal 329 through which data are exchanged with an external apparatus, an interface 328 that connects the data terminal 329 to the CPU 322 and an operating member 330 that includes a mode setting button through which various switch outputs are input to the CPU 322. Information indicating whether or not raw data are required is input through the mode setting button 330. If raw data are not required, a fast mode, which is to be detailed later, is set, whereas if raw data are required, an original image mode is set. In the fast mode, JPEG compressed data are recorded, and in the original image mode, raw data are output as well as recording the JPEG compressed data.

(Operation in Fast Mode)

The following is an explanation of the operation performed by the electronic camera 310 in the fast mode.

The user selects whether or not raw data are required by operating the mode setting button 330. The information thus set is transmitted to the mode control unit 321 via the CPU 322.

Figure 20:
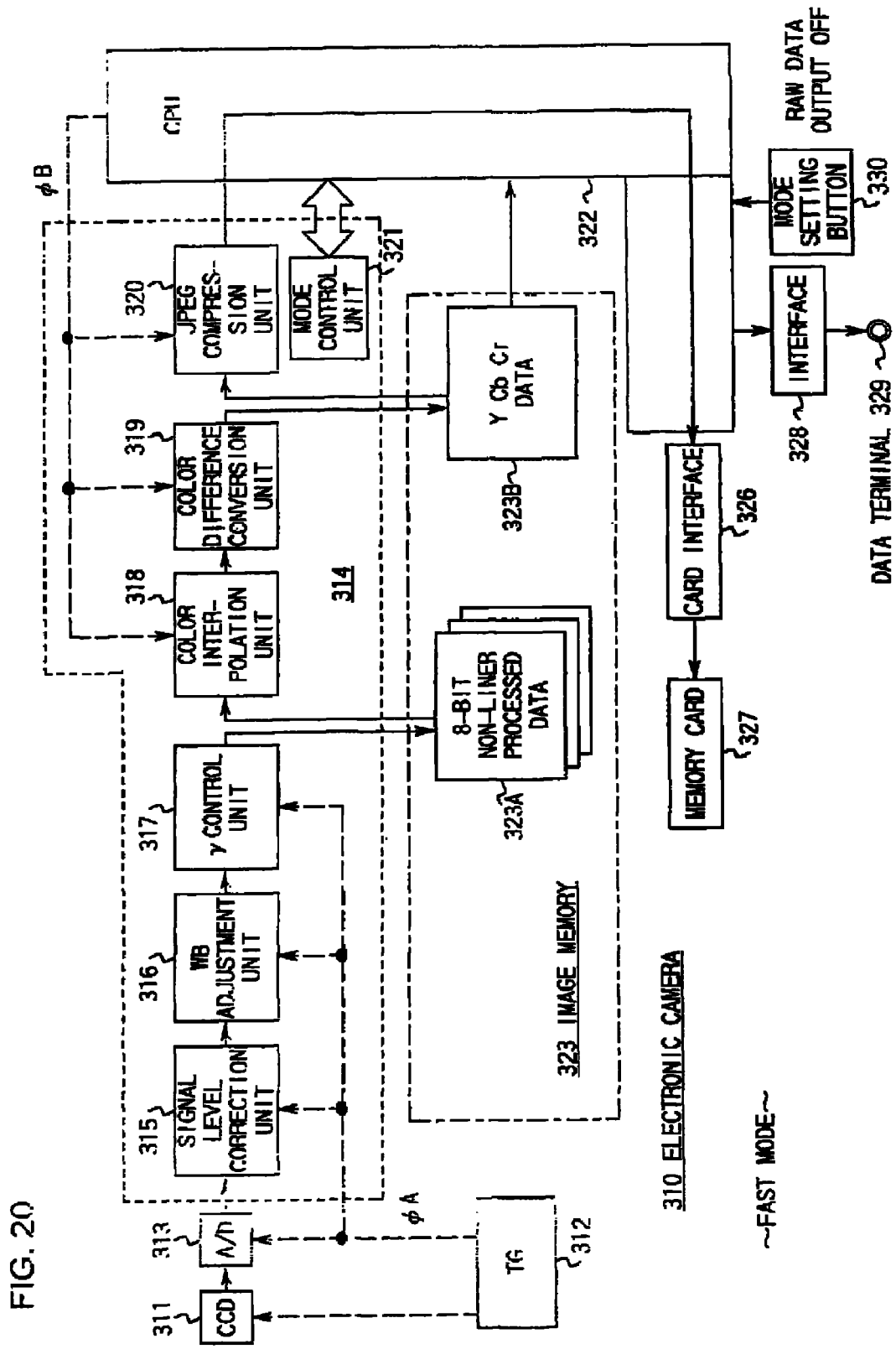
FIG. 20 illustrates the signal path through which signals travel when the electronic camera in FIG. 19 is set in the fast mode.

If the user operation indicates that no raw data are required, the mode control unit 321 selects the signal path corresponding to the fast mode for the image signal processor 314. FIG. 20 schematically illustrates the fast mode signal path. As illustrated in FIG. 20, the mode control unit 321 connects the A/D conversion unit 313, the signal level correction unit 315, the white balance adjustment unit 316 and the gamma control unit 317 so as to form a pipeline. Then, the mode control unit 321 supplies the operation clock ØA from the timing generator 312 to the signal level correction unit 315, the white balance adjustment unit 316 and the gamma control unit 317 to set these processing units to engage in synchronous operations.

When image data are output by the image-capturing device 311, the image data undergo linear quantization at the A/D conversion unit 313 to be converted to 12~16-bit digitized image data. The digitized image data undergo clamp correction and gain control at the signal level correction unit 315, then undergo white balance adjustment at the white balance adjustment unit 316 and are sequentially output in units of single lines to the gamma control unit 317. The gamma control unit 317 performs gamma control on the image data and also outputs data achieved by reducing the number of quantization bits of the image data to approximately 8 bits.

The sequence of signal processing operations performed up to this point is identical to that performed by the line processing circuit 100 in FIG. 3, and is executed in real time in units of individual pixels for each line in synchronization with the operation clock ØA supplied by the timing generator 312. The output from the gamma control unit 317 (non-linear processed data of approximately 8 bits) is temporarily stored in a storage area 323A in the image memory 323. At this time, the mode control unit 321 allocates a "raw data storage area 323C," which is used in the original image mode to be detailed later, as part of the storage area 323A to increase the storage capacity of the storage area 323A. As a result, it becomes possible to hold image data corresponding to a plurality of frames that are undergoing the processing in retreat in the storage area 323A. Through this image data retreat operation, the electronic camera 310 is able to start signal processing of the next frame without having to wait for the signal processing to be completed.

The color interpolation unit 318 reads out the image data from the storage area 323A in units of predetermined blocks to execute color interpolation processing on the image data through local pixel calculation and to calculate the three color components, i.e., R, G and B for each of the pixels. The color difference conversion unit 319 sequentially converts the R, G and B components to color difference data constituted of a brightness Y and color differences Cr and Cb. The processing performed by the color interpolation unit 318 and the color difference conversion unit 319 is identical to that performed by the block processing circuit 200 in FIG. 4 and is executed in conformance to the operation clock ØB supplied by the CPU 322.

The color difference data (Y, Cb, Cr) resulting from the conversion described above are temporarily stored in a storage area 323B in the image memory 323. In order to preview the captured image at this point, the monitor display circuit 324 reads out the color difference data (Y, Cb, Cr) in the storage area 323B via the CPU 322 and displays the captured image on the monitor 325.

The JPEG compression unit 320 reads out the color difference data (Y, Cb, Cr) from the storage area 323B and executes irreversible image compression (DCT conversion, quantization, coding) in synchronization with the operation clock ØB. The image data resulting from the irreversible compression are recorded in the memory card 327 via the CPU 322 and the card interface 326.

Depending upon the compression rate setting, the CPU 322 may directly read out the color difference data (Y, Cb, Cr) from the storage area 323B to record them in the memory card 327 via the card interface 326.

The processing in the fast mode is completed when the operation described above ends.

(Operation in Original Image Mode)

Figure 21:
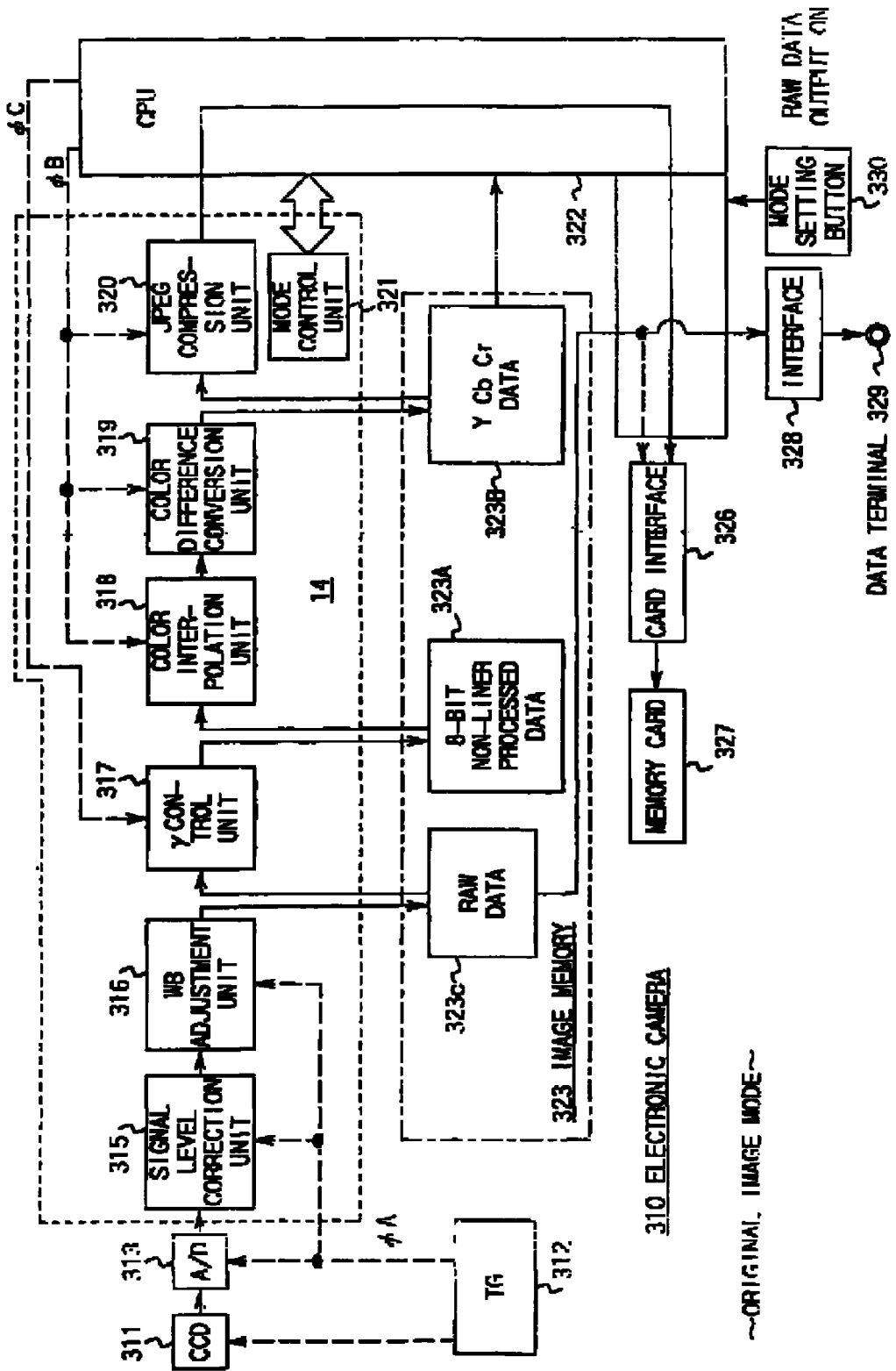
FIG. 21 illustrates the signal path through which signals travel when the electronic camera in FIG. 19 is set in the original image mode.

If, on the other hand, the user operation indicates that raw data are required via the mode setting button 330, the mode control unit 321 selects the signal path corresponding to the original image mode for the image signal processor 314. FIG. 21 schematically illustrates the original image mode signal path.

As shown in FIG. 21, the mode control unit 321 sets the signal path so that the output from the white balance adjustment unit 316 is provided to the gamma control unit 317 via the image memory 323. Then, the mode control unit 321 supplies the signal level correction unit 315 and the white balance adjustment unit 316 with the operation clock ØA from the timing generator 312. In addition, the mode control unit 321 switches the operation clock for the gamma control unit 317 to the operation clock ØC, which is faster than the operation clock ØA.

When image data are output by the image-capturing device 311, the image data undergo linear quantization at the A/D conversion unit 313 to be converted to 12~16-bit digitized image data. The digitized image data sequentially undergo processing at the signal level correction unit 315 and the white balance adjustment unit 316, and then are temporarily stored in the storage area 323C in the image memory 323 as approximately 12~16-bit raw data. The gamma control unit 317 performs gamma control while reading out the raw data from the storage area 323C in synchronization with the fast operation clock ØC and outputs the processed data as non-linear processed data of approximately 8 bits.

The approximately 8-bit non-linear processed data are temporarily stored in the storage area 323A in the image memory 323. The color interpolation unit 318 reads out the image data from the storage area 323A in units of predetermined blocks to execute interpolation processing through local pixel calculation, and to calculate the three color components, i.e., R, G and B, for each pixel. The color difference conversion unit 319 sequentially converts the R, G and B components to color difference data, which is constituted of a brightness Y and color differences Cr and Cb.

The color difference data (Y, Cb, Cr) resulting from the conversion described above are temporarily stored in the storage area 323B in the image memory 323. The JPEG compression unit 20 executes image compression (DCT conversion, quantization, coding) in synchronization with the operation clock ØB while reading out the color difference data (Y, Cb, Cr) as necessary from the storage area 323B. The image data achieved through the irreversible compression are then recorded in the memory card 327 via the CPU 322 and the card interface 326.

It is to be noted that depending upon the compression rate setting, the CPU 322 may directly read out the color difference data (Y, Cb, Cr) from the storage area 323B to record the color difference data in the memory card 327 via the card interface 326.

The raw data remain intact in the storage area 323C. The CPU 322 reads out the raw data and outputs the raw data thus read out through the data terminal 329 via the interface 328. As a result, the raw data are transferred and stored into an external storage medium or the like connected to the data terminal 329.

When the processing described above ends, the operation in the original image mode is completed.

As explained above, in this embodiment, the mode control unit 321 dynamically selects the signal path within the image signal processor 314. As a result, the raw data are stored in the storage area 323C in the original image mode so that they can be utilized later.

In the fast mode, on the other hand, the higher speed in the signal processing is achieved synergistically through the two high-speed functions described below.

(1) Raw data read/write at the image memory 323 is omitted.

(2) The sequence of signal processing operations (image-capturing device 311->A/D conversion unit 313->signal level correction unit 315->white balance adjustment unit 316->gamma control unit 317->storage area 323A) is implemented in real time in synchronization with the operation clock ØA.

Thus, it is possible to nearly complete the signal processing up to the gamma control in the fast mode within the period of time required in the original image mode to store the raw data in the image memory 323.

In the embodiment, the storage area 323C in an idling state is effectively utilized as part of the storage area 323A in the fast mode. As a result, it becomes possible to utilize the storage area 323A with a larger capacity as a retreat area during signal processing so that the photographing enabling intervals in the fast mode (in particular, during continuous photographing) can be greatly reduced.

In addition, when the mode control unit 321 selects the signal path for the original image mode, it also switches the operation clock of the gamma control unit 317 from the operation clock ØA to the faster operation clock ØC. Thus, the length of time required for gamma control processing is also minimized in the original image mode.

While an explanation is given above in reference to the embodiment on an example in which raw data are output to the outside in the original image mode, the present invention is not limited to this example. For instance, the CPU 322 may store raw data, either in the original state or in a reversibly compressed state, in a recording medium such as a PC card mounted at the electronic camera.

In addition, in the embodiment explained above, the storage area 323C in an idling state is effectively utilized as part of the storage area 323A in the fast mode so that the storage area 323A can be used as a buffer area for non-linear processed data of approximately 8 bits. However, the present invention is not limited to this example. In general, the storage area 323C, which is left in an idling state in the fast mode, may be utilized as a retreat area for image data undergoing processing, e.g., compressed image data yet to be recorded in the memory card and image data in the process of being compressed. When such a structure is adopted, too, a photographing operation for the next frame can be started without having to wait for the completion of the image data processing.

Furthermore, while the output from the white balance adjustment unit 316 is recorded in the area 323A of the image memory 323 as raw data in the original image mode in the embodiment described above, the present invention is not limited to this example. As a general rule, as long as image data have not undergone any irreversible signal processing such as a reduction of the number of quantization bits, gradation conversion and pixel thinning, they can be used as raw data faithful to the original image. Consequently, an output from the A/D conversion unit 313, an output from the signal level correction unit 315, a signal manifesting immediately after black level correction or the like may be recorded in the image memory 323 as raw data, instead.

Moreover, while the raw data are extracted from the stage preceding the gamma control unit 317, which performs irreversible gradation conversion in the embodiment, the present invention is not limited to this example. For instance, if the electronic camera is provided with a signal processing unit that engages in irreversible pixel thinning, raw data may be extracted from a stage preceding the signal processing unit.

The following advantages are achieved by adopting the embodiment.

(1) In the fast mode, output data from the gamma control unit 317, which is a non-reciprocal circuit, are first recorded in the image memory 323, whereas in the original image mode, output data from the WB adjustment unit 316 at the stage preceding the gamma control unit 317, which is a non-reciprocal circuit, are temporarily recorded in the image memory 323. In other words, through the control implemented by the mode control unit 321, the data path is dynamically switched. As a result, the length of signal processing time is reduced in the fast mode while reliable utilization of raw data is achieved in the original image mode.

(2) The raw data storage area used in the original image mode is effectively utilized as a data retreat area in the fast mode. As a result, the data retreat area is substantially enlarged to achieve a further reduction in the photographing enabling intervals in the fast mode.

(3) When the user specifies raw data utilization through an operation of the mode setting button 330, the original mode is selected, whereas the fast mode is selected if the user does not specify raw data utilization. Thus, correct selection can be made between the fast mode and the original image mode in correspondence to whether or not the use of raw data is required.

(4) When the signal path for the original image mode is selected, the operation clock of the gamma control unit 317 is switched to a faster operation clock. Consequently, a maximum speed in the signal processing is achieved in the original image mode, as well.

What is claimed is:

1. An electronic camera comprising:
   an image-capturing device;
   a first signal processing unit that performs, at least, A/D conversion on an image signal generated by said image-capturing device to convert the image signal to digital image data;
   a second signal processing unit that performs irreversible signal processing on the image data from said first signal processing unit to generate irreversible-signal-processed image data;
   an image memory capable of temporarily storing the image data; and
   an operation control unit that selects a signal path between said two signal processing units in correspondence to an operation mode set to either (1) or (2) below:
   (1) a fast mode, in which a sequence of signal processing operations is executed continuously by providing the image data from said first signal processing unit to said second signal processing unit and engaging said two signal processing units in synchronous operation;
   (2) an original image mode, in which the image data from said first signal processing unit is stored in said image memory, the image data read out from said image memory are provided to said second signal processing unit and said two signal processing units are made to engage in operations, each performed with a timing different from the timing of the other, wherein:
   the operation control unit accepts an external operation indicating whether or not raw data, which is image data yet to undergo irreversible signal processing performed by said second signal processing unit, are required, selects and executes said fast mode if the external operation indicates that no raw data are required and selects and executes said original image mode if the external operation indicates that raw data are required, and
   a record control unit that records the irreversible-signal-processed image data into a recording medium in the fast mode, and records the irreversible-signal-processed image data and raw data present in the image memory into the recording medium in the original image mode.

2. An electronic camera according to claim 1, wherein:
   said operation control unit utilizes a storage area in said image memory provided to store the output from said first signal processing unit in said original image mode as a buffer area for keeping in retreat image data undergoing processing in said fast mode.

3. An electronic camera according to claim 1, wherein:
   said operation control unit sets an operation clock of said second signal processing unit faster than an operation clock of said first signal processing unit in said original image mode.

4. An electronic camera according to claim 1, wherein:
   said second signal processing unit performs, at least, either irreversible gradation conversion or irreversible pixel thinning.

\* \* \* \* \*